(12) United States Patent
Lin et al.

(10) Patent No.: US 12,237,934 B2
(45) Date of Patent: Feb. 25, 2025

(54) METHOD AND APPARATUS FOR SENDING AND RECEIVING FEEDBACK INFORMATION, AND STORAGE MEDIUM

(71) Applicant: ZTE CORPORATION, Guangdong (CN)

(72) Inventors: Wei Lin, Guangdong (CN); Yajun Zhao, Guangdong (CN); Xincai Li, Guangdong (CN); Juan Liu, Guangdong (CN); Ling Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 522 days.

(21) Appl. No.: 17/633,685

(22) PCT Filed: Aug. 10, 2020

(86) PCT No.: PCT/CN2020/108101
§ 371 (c)(1),
(2) Date: Feb. 8, 2022

(87) PCT Pub. No.: WO2021/027754
PCT Pub. Date: Feb. 18, 2021

(65) Prior Publication Data
US 2022/0303069 A1 Sep. 22, 2022

(30) Foreign Application Priority Data
Aug. 9, 2019 (CN) .......................... 201910736482.X

(51) Int. Cl.
*H04L 1/1867* (2023.01)
*H04L 1/1812* (2023.01)
*H04L 5/00* (2006.01)

(52) U.S. Cl.
CPC .......... *H04L 1/1896* (2013.01); *H04L 1/1812* (2013.01); *H04L 5/0055* (2013.01)

(58) Field of Classification Search
None
See application file for complete search history.

(56) References Cited

FOREIGN PATENT DOCUMENTS

| CN | 107483160 A | 12/2017 |
| CN | 108011696 A | 5/2018 |
| CN | 108111263 A | 6/2018 |
| CN | 108809502 A | 11/2018 |
| CN | 109005014 A | 12/2018 |

(Continued)

OTHER PUBLICATIONS

"Considerations for failure recovery in NR," 3GPP TSG-RAN WG2 Meeting #106 Reno, US, May 13-17, 2019.

(Continued)

*Primary Examiner* — Walter J Divito
(74) *Attorney, Agent, or Firm* — KDW Firm PLLC

(57) ABSTRACT

Provided are a method and apparatus for sending and receiving feedback information, and a storage medium. The method includes: receiving service data sent by a user equipment (UE); and sending downlink feedback indication (DFI) information corresponding to the service data to the UE. Where the DFI information includes a HARQ ACK/non-acknowledgement NACK indication, and the HARQ ACK/NACK indication is configured for indicating a decoding result of a transport block (TB) and/or a code block group (CBG) in the service data decoded by a base station.

19 Claims, 6 Drawing Sheets

(56) References Cited

FOREIGN PATENT DOCUMENTS

| CN | 110535565 A | 12/2019 |
|---|---|---|
| WO | 2018170001 A1 | 9/2018 |
| WO | 2020067815 A1 | 4/2020 |

OTHER PUBLICATIONS

3rd Generation Partnership Project; Technical Specification Group Radio Access Network; Evolved Universal Terrestrial Radio Access (E-UTRA); Multiplexing and channel coding(Release 13); 3GPP TS 36.212, V.13.9.0, Jun. 2019.
"Remaining issues on the configured grant for NR-U," 3GPP TSG RAN WG1, Apr. 20-30, 2020.
Partial European Search Report for Application No. 20851528 dated Oct. 19, 2023.
"Enhancement to configured grants in NR unlicensed," 3GPP TSG RAN WG1 Meeting #97, May 13-17, 2019.
"3 Generation Partnership Project; Technical Specification Group Radio Access Network; Evolved Universal Terrestrial Radio Access (E-ULTRA); Multiplexing and channel coding", 3GP TS 36.212 vol. RAN WG1, No. V15, Jun. 24, 2019.
Supplemental European Search Report for Application No. 20851528 dated Oct. 6, 2023.
International Search Report for the International Patent Application No. PCT/CN2020/108101, mailed Nov. 13, 2020, 6 pages.
Samsung, "Enhancements on configured grant for NR-U" 3GPP TSG RAN WG1 WG1 #97 R1-1906923 Reno, USA, May 13-17, 2019, 5 pages.
Oppo, "Considerations on configured grant for NR-U" 3GPP TSG RAN WG1 Meeting #95 R1-1812804 Spokane, USA, Nov. 12-16, 2018, 3 pages.
Oppo, "On configured grant for NR-U" 3GPP TSG RAN WG1 #97 R1-1906489 Reno, USA, May 13-17, 2019, 4 pages.
China National Intellectual Property Administration Notice of the first review opinion for CN Application No. 201910736482.X, dated Apr. 12, 2024, 14 pages.
China National Intellectual Property Administration Search Report for CN application No. 201910736482.X, dated Apr. 9, 2024, 6 pages.

METHOD AND APPARATUS FOR SENDING AND RECEIVING FEEDBACK INFORMATION, AND STORAGE MEDIUM

CROSS-REFERENCE TO RELATED APPLICATIONS

This is a National Stage Application, filed under 35 U.S.C. 371, of International Patent Application No. PCT/CN2020/108101, filed on Aug. 10, 2020, which is based on and claims priority to Chinese Patent Application No. 201910736482.X, filed with the China National Intellectual Property Administration (CNIPA) on Aug. 9, 2019, disclosures of which are incorporated herein by reference in their entireties.

TECHNICAL FIELD

The present application relates to wireless communication networks, and in particular, a method and apparatus for sending feedback information, a method and apparatus for receiving feedback information and a storage medium.

BACKGROUND

After a user equipment (UE) sends scheduling-free service data to a base station, the base station needs to feed back a service data decoding result to the UE. However, in a case where the base station feeds back the service data decoding result, what information needs to be carried by the base station remains as a problem urgently to be solved. In addition, in a case where the transport block (TB) is configured with the code block group, how to perform a decoding feedback on a transport block and a code block group (CBG) also remains as a problem urgently to be solved.

SUMMARY

Embodiments of the present application provide a method for sending feedback information, a method for receiving feedback information, an apparatus for sending feedback information, an apparatus for receiving feedback information, and a storage medium, to implement a downlink feedback on service data.

An embodiment of the present application provides a method for sending feedback information. The method includes: receiving service data sent by a user equipment (UE); and sending downlink feedback indication (DFI) information corresponding to the service data to the UE. The DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

An embodiment of the present application provides a method for receiving feedback information. The method includes: sending service data to a base station; and receiving downlink feedback indication (DFI) information corresponding to the service data. The DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

An embodiment of the present application provides an apparatus for sending feedback information. The apparatus includes a receiving module and a sending module. The receiving module is configured to receive service data sent by a user equipment (UE). The sending module is configured to send downlink feedback indication (DFI) information corresponding to the service data to the UE, where the DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

An embodiment of the present application provides an apparatus for receiving feedback information. The apparatus includes a sending module and a receiving module. The sending module is configured to send service data to a base station. The receiving module is configured to receive downlink feedback indication (DFI) information corresponding to the service data, where the DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

An embodiment of the present application provides a storage medium. The storage medium stores a computer program, where the computer program, when executed by a processor, implements the method of any one of the embodiments described above.

DETAILED DESCRIPTION

Embodiments of the present application will hereinafter be described with reference to the accompanying drawings. Embodiments and features in embodiments of the present application may be arbitrarily combined with each other without conflict.

With the development of the 5th generation mobile communication technology (5G), a 5G system is devoted to satisfying technical metrics such as higher rate (e.g. gigabit per second), large number of links (e.g. 1 million/km$^2$), ultra-low latency (e.g. millisecond), higher reliability, hundreds of times of energy efficiency improvement, to support new demand changes. The 5G may also be referred to as new radio (NR). The NR-based access to unlicensed spectrum (NR-U) technology has an application prospect in the aspects of Internet of things, factory automation and the like, and many problems of the NR-U are required to be solved.

For the use of the unlicensed spectrum, certain regulatory policies are followed. For instance, a device performs a listen before talk (LBT) before sending data using an unlicensed carrier, and a device that successfully performs the LBT may send service data on the unlicensed carrier. The listen before talk may also be referred to as clear channel assessment (CCA). Both the NR and the NR-U support uplink scheduling-free transmission (i.e. an autonomous transmission), and unlike the NR, physical uplink shared channel (PUSCH) data is transmitted for the first time using scheduling-free transmission resources in the NR-U, if the base station decodes the PUSCH data incorrectly, the UE may retransmit the PUSCH data using the scheduling-free transmission resources, and at this time, explicit decoding feedback information needs to be introduced for the retransmission characteristic.

At present, in the NR-U, a decoding feedback for a scheduling-free uplink transmission is an urgent problem to be solved, especially on the basis of transmission of the TB, a support of a CBG transmission is introduced, and a downlink feedback scheme for the scheduling-free transmission needs to be determined. The embodiments of the present disclosure provide a feasible scheme for parameter information included in a downlink feedback indication (DFI) and for a joint decoding feedback of different scheduling granularities (including TB and/or CBG) in terms of a downlink feedback requirement of the scheduling-free transmission.

Figure 1:
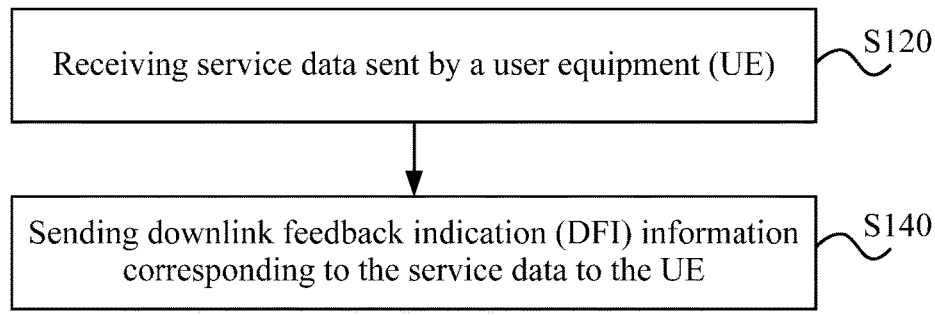
FIG. 1 is a flowchart of a method for sending feedback information provided in an embodiment of the present application.

FIG. 1 is a flowchart of a method for sending feedback information provided in an embodiment of the present application. This embodiment is applicable to a case of a joint decoding feedback for different scheduling granularities, and this embodiment may be performed by a base station.

As shown in FIG. 1, the method provided in this embodiment includes followings.

In S120, service data sent by a user equipment (UE) is received.

In S140, downlink feedback indication (DFI) information corresponding to the service data is sent to the UE.

The DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

The service data may be PUSCH data or physical downlink shared channel (PDSCH) data. In an embodiment, the UE is configured to send service data to the base station, and the base station feeds back the DFI information to the UE. That is, in an embodiment, the service data includes the PUSCH data. In the service data, a data transmission may be performed through different scheduling granularities, for example, the data transmission may be performed in a form of a TB, and the data transmission may also be performed in a form of a CBG. The base station configures an uplink scheduling-free resource and a HARQ process range used by a scheduling-free transmission for the UE, the UE may transmit PUSCH data by utilizing the uplink scheduling-free resource and a HARQ process. The base station receives and decodes PUSCH data of the scheduling-free transmission in the scheduling-free resource, and the base station feeds back the DFI information to the UE according to a receiving and decoding result of the PUSCH data. The HARQ process range refers to an effective range of a HARQ process configured by the base station for a scheduling-free transmission of the UE in advance, that is, the HARQ process in the HARQ process range may be configured for a transmission of scheduling-free service data. The DFI information is one of downlink control information (DCI), and a bit domain overhead of the DFI is kept consistent with a bit domain overhead of one DCI in a current DCI format. In an embodiment, the DFI information further includes at least one of: a downlink control information (DCI) usage marking, a carrier indication, a bandwidth part (BWP) indication, a precoding information indication, a transmission power control (TPC) indication, a modulation and coding scheme (MCS), or a rank indication (RI). Where the DCI usage marking is configured for indicating that a usage currently represented by a piece of DCI is a feedback of a DFI or an activation/deactivation of the uplink scheduling-free resource, the carrier indication is configured for indicating that the DCI is effective for a carrier corresponding to a carrier index, and the BWP indication is configured for indicating that the DCI is effective for a BWP corresponding to a BWP index. The DCI usage marking is configured for distinguishing whether the DCI is configured for DFI feedback or configured for activating/deactivating the uplink scheduling-free resource; the carrier indication is applied to a multi-carrier scheduling and is configured for indicating that the DCI is effective for a carrier corresponding to a specific carrier index; and the BWP indication is applied to a multi-BWP scheduling or a BWP switching process and is configured for indicating that the DCI is effective for a BWP corresponding to the specific BWP index.

In an embodiment, the method for sending the feedback information further includes: a time interval between completion of reception of the service data and completion of preparation of the DFI information is determined; and a feedback effectiveness of the DFI information is determined according to the time interval. In an embodiment, determining the feedback effectiveness of the DFI information according to the time interval includes: for a HARQ process, in a case where the time interval is larger than or equal to N symbols or slots, the DFI information for the HARQ process being an effective feedback; and for a HARQ process, in a case where the time interval is less than N symbols or slots, the DFI information for the HARQ process being an ineffective feedback, and N is configured through radio resource control (RRC) signaling configuration or is determined according to a subcarrier interval transmitted by a physical uplink shared channel (PUSCH). In an embodiment, the UE sends PUSCH data to the base station using the scheduling-free resource and the HARQ process, and a DFI feedback for the HARQ process is an ineffective feedback within N symbols or slots after the UE completing a transmission of the PUSCH data, in other words, the UE sends the PUSCH data using the HARQ process, and a time interval between completion of sending of the PUSCH data and start of feedback of the DFI information is not less than N symbols or slots. If a HARQ ACK/NACK feedback of the DFI for the HARQ process is effective, the UE may determine a PUSCH decoding result of the HARQ process according to the HARQ ACK/NACK feedback information. The UE uses the HARQ process to send the PUSCH data, a time interval between completion of sending of the PUSCH data and completion of the DFI feedback is less than N symbols or slots, the HARQ ACK/NACK feedback of the DFI for the HARQ process is ineffective, and the UE cannot determine the PUSCH decoding result of the HARQ process according to the HARQ ACK/NACK feedback. The value of N may be configured by RRC signaling or may be determined according to a subcarrier interval of a PUSCH transmission, without limitation.

In an embodiment, the HARQ ACK/NACK indication includes at least one of a TB-level decoding feedback indication information corresponding to the HARQ process or a CBG-level decoding feedback indication information corresponding to the HARQ process. In an embodiment, the base station configures the uplink scheduling-free resource and the HARQ process range used by the scheduling-free transmission for the UE, the UE may transmit the PUSCH data by utilizing the uplink scheduling-free resources and the HARQ process. The base station receives and decodes a transmission of scheduling-free PUSCH data in the scheduling-free resource, and the base station feeds back the DFI information to the UE according to a receiving and decoding result of the PUSCH data. The DFI information includes the HARQ ACK/NACK indication, and the HARQ ACK/NACK indication information performs a feedback indication for a decoding result of the HARQ process. The HARQ ACK/NACK indication includes at least one of: TB-level decoding feedback indication information for the HARQ process or CBG-level decoding feedback indication information for the HARQ process. The TB-level decoding feedback indication information for the HARQ process refers to feedback information of the base station to a TB receiving and decoding result transmitted in the HARQ process, and the CBG-level decoding feedback indication information for the HARQ process refers to feedback information of the base station to a CBG receiving and decoding result transmitted in the HARQ process. One TB may contain one or more CBGs.

In an embodiment, the PUSCH data includes uplink control information (UCI), the UCI includes an uplink assignment index (UAI), which is configured for counting PUSCH data sent by the UE. In an embodiment, the method for sending the feedback information further includes: a missed detection of the PUSCH data is determined according to the UAI. In an embodiment, the UE carries uplink control information (UCI) when transmitting the PUSCH data by using the uplink scheduling-free resource, the UCI contains an uplink assignment index (UAI) like a downlink assignment index (DAI), the UAI is configured for counting PUSCH data sent by the UE, the base station determines whether there is the missed detection of the PUSCH data according to the information, and transmits a decoding feedback as NACK when the HARQ ACK/NACK feedback is performed for PUSCH data of a missed detection HARQ process. Exemplarily, the UAI counts that the UE sends PUSCH data to the base station through HARQ processes 1, 2, 3, and 4, but the base station receives PUSCH data transmitted using the HARQ processes 1, 3, and 4, i.e., PUSCH data transmitted using the HARQ process 2 is missed. For the PUSCH data of the HARQ process 2, the base station transmits a decoding feedback as NACK when the HARQ ACK/NACK feedback is performed.

After receiving PUSCH data transmitted by the UE on the uplink scheduling-free resource, a base station feeds back TB-level ACK information for a correctly decoding HARQ process, feeds back TB-level NACK information for an incorrectly decoding and missed HARQ process, and for a CBG-level ACK/NACK feedback, one of following schemes is included.

In an embodiment, the HARQ ACK/NACK indication includes at least one of following items: TB-level ACK/NACK information corresponding to a first HARQ process set, or CBG-level ACK/NACK information corresponding to a first HARQ process set. Where the first HARQ process set includes one or more HARQ processes used by the scheduling-free transmission of the UE. In an embodiment, all HARQ processes in the first HARQ process set are one or more HARQ processes currently used by the scheduling-free transmission of the UE. That is, the first HARQ process set may include one or more HARQ processes, and a number of HARQ processes included in the first HARQ process set is related to a number of HARQ processes used by the scheduling-free transmission of the UE. The HARQ ACK/NACK indication includes at least one of following items: TB-level ACK/NACK information corresponding to a first HARQ process set and CBG-level ACK/NACK information corresponding to the first HARQ process set.

In an embodiment, the HARQ ACK/NACK indication only includes TB-level ACK/NACK information corresponding to a first HARQ process set. That is, for one or more HARQ processes used by the scheduling-free transmission of the UE, the base station only feeds back the TB-level ACK/NACK information and does not feed back the CBG-level ACK/NACK information. Exemplarily, HARQ processes configured by the base station for the scheduling-free transmission of the UE are processes 1 to 8, a number of split CBGs of each TB is configured to be 4, the UE transmits PUSCH data by using HARQ processes 2, 5, 7 and 8. Then, TB_1 corresponding to the HARQ process 2 is decoded correctly, the detection of TB_2 corresponding to the HARQ process 5 is missed, and TB_3 corresponding to the HARQ process 7 is incorrectly decoded. Where CBG_1 and CBG_4 of TB_3 are incorrectly decoded, CBG_2 and CBG_3 are decoded correctly; TB_4 corresponding to the HARQ process 8 is incorrectly decoded, where CBG_3 of TB_4 is incorrectly decoded, and the remaining CBGs are incorrectly decoded. For TB-level ACK/NACK feedback being 1000, that is, the CBG-level ACK/NACK information is not fed back.

Figure 2:
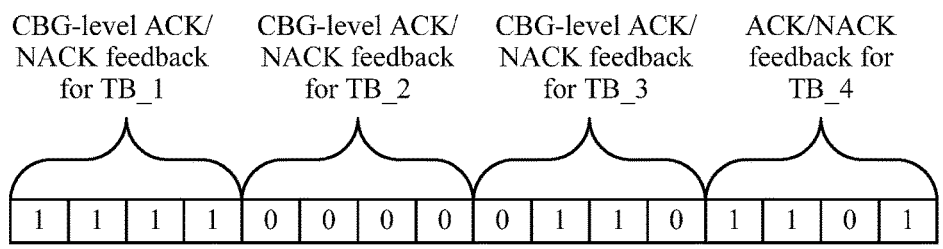
FIG. 2 is a diagram showing a CBG-level ACK/NACK joint feedback provided in an embodiment of the present application.

In an embodiment, the HARQ ACK/NACK indication only includes the CBG-level ACK/NACK information corresponding to the first HARQ process set. That is, for one or more HARQ processes used by the scheduling-free transmission of the UE, the base station only feeds back the CBG-level ACK/NACK information and does not feed back the TB-level ACK/NACK information. Exemplarily, processes configured by the base station for the scheduling-free transmission of the UE are processes 1 to 8, and a number of split CBGs of each TB is configured to be 4. That is, each TB may be split into 4 CBGs. The UE transmits PUSCH data by using HARQ processes 2, 5, 7, and 8, i.e., the first HARQ process set includes: HARQ processes 2, 5, 7, and 8. Where TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, CBG_2 and CBG_3 of TB_3 are decoded correctly; TB_4 corresponding to the HARQ process 8 is incorrectly decoded, where CBG_3 of TB_4 is incorrectly decoded, and the remaining CBGs are decoded correctly, then the CBG-level ACK/NACK feedback for HARQ processes 2, 5, 7 and 8 is 1111000001101101, i.e. a HARQ ACK/NACK feedback result is 1111000001101101, for a total of 16 bits. FIG. 2 is a diagram showing a CBG-level ACK/NACK joint feedback provided in an embodiment of the present application. As shown in FIG. 2, a CBG-level ACK/NACK feedback for TB_1 is 1111, a CBG-level ACK/NACK feedback for TB_2 is 0000, a CBG-level ACK/NACK feedback for TB_3 is 0110, and a CBG-level ACK/NACK feedback for TB_4 is 1101.

Figure 3:
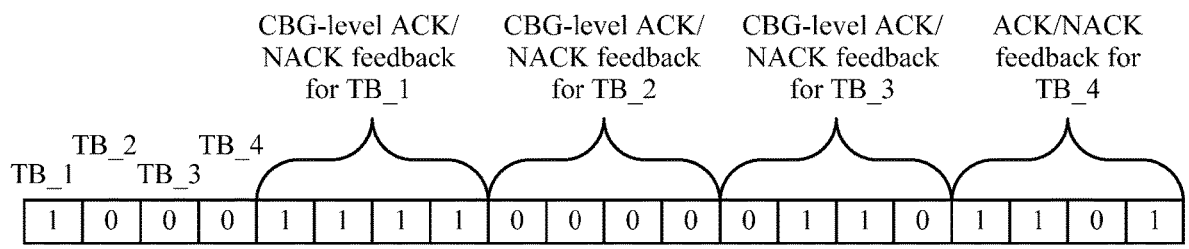
FIG. 3 is a diagram showing a joint feedback of a TB-level ACK/NACK and a CBG-level ACK/NACK provided in an embodiment of the present application.

In an embodiment, the HARQ ACK/NACK indication includes TB-level ACK/NACK information corresponding to a first HARQ process set and CBG-level ACK/NACK information corresponding to the first HARQ process set. In other words, for one or more HARQ processes used by the scheduling-free transmission of the UE the base station simultaneously feeds back the TB-level ACK/NACK information and the CBG-level ACK/NACK information Exemplarily, processes configured by the base station for the scheduling-free transmission of the UE are processes 1 to 8, and a number of split CBGs of each TB is configured to be 4, i.e., each TB may be split into 4 CBGs. The UE transmits PUSCH data by using HARQ processes 2, 5, 7, and 8, i.e., the first HARQ process set includes HARQ processes 2, 5, 7, and 8. Where TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, CBG_2 and CBG_3 of TB_3 are decoded correctly; TB_4 corresponding to the HARQ process 8 is incorrectly decoded, where CBG_3 of TB_4 is incorrectly decoded, and the remaining CBGs are decoded correctly, then the TB-level ACK/NACK feedback for HARQ processes 2, 5, 7 and 8 is 1000, and the CBG-level ACK/NACK feedback for HARQ processes 2, 5, 7 and 8 is 1111000001101101, i.e. a HARQ ACK/NACK feedback result is 10001111000001101101, for a total of 20 bits. FIG. 3 is a diagram showing a joint feedback of a TB-level ACK/NACK and a CBG-level ACK/NACK provided in an embodiment of the present application. As shown in FIG. 3, a TB-level ACK/NACK feedback for HARQ processes 2, 5, 7, and 8 is 1000, a CBG-level ACK/NACK feedback for TB_1 for HARQ processes is 1111, a CBG-level ACK/NACK feedback for TB_2 is 0000, a CBG-level ACK/NACK feedback for TB_3 is 0110, and a CBG-level ACK/NACK feedback for TB_4 is 1101.

Figure 4:
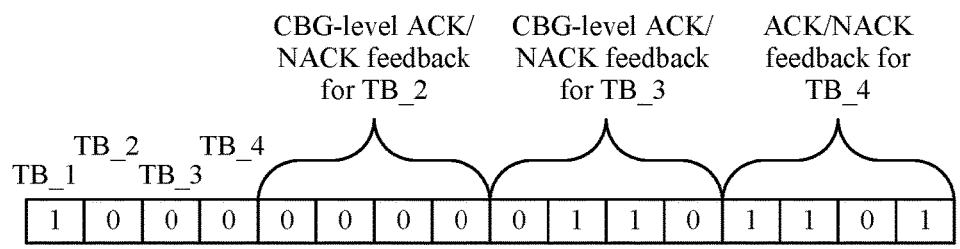
FIG. 4 is a diagram showing another joint feedback of a TB-level ACK/NACK and a CBG-level ACK/NACK provided in an embodiment of the present application.

In an embodiment, the HARQ ACK/NACK indication includes TB-level ACK/NACK information corresponding to a first HARQ process set and CBG-level ACK/NACK information corresponding to a second HARQ process set. The first HARQ process set includes one or more HARQ processes used by a scheduling-free transmission of the UE, and the second HARQ process set is all HARQ processes with TB-level feedback being NACK in the first HARQ process set. In an embodiment, in a case where a HARQ process with TB-level feedback being NACK exists in the first HARQ process set, a number of HARQ processes included in the second HARQ process set is at least one; in a case where a HARQ process with TB-level feedback being NACK does not exist in the first HARQ process set, a number of HARQ processes included in the second HARQ process set is zero, that is, a TB-level feedback corresponding to all HARQ processes in the first HARQ process set is ACK. For a HARQ processes used by the UE for the scheduling-free transmission, the base station feeds back CBG-level ACK/NACK information simultaneously to all HARQ processes with TB-level feedback being NACK; if the base station receives a PUSCH data transmission of the HARQ process, then the CBG-level ACK/NACK information is fed back according to a CBG-level decoding result, the ACK is fed back when the decoding is correct, and the NACK is fed back when the decoding is incorrect; and if the base station misses to detect the PUSCH data transmission of the HARQ process, then the CBG-level ACK/NACK information feedback is NACK. Exemplarily, HARQ processes configured by the base station for the scheduling-free transmission of the UE are processes 1 to 8, and a number of split CBGs of each TB is configured to be 4, i.e., each TB may be split into 4 CBGs. The UE transmits PUSCH data by using HARQ processes 2, 5, 7, and 8, TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, CBG_2 and CBG_3 of TB_3 are decoded correctly; TB_4 corresponding to the HARQ process 8 is incorrectly decoded, where CBG_3 of TB_4 is incorrectly decoded, and the remaining CBGs are decoded correctly, then the TB-level ACK/NACK feedback is 1000, and the CBG-level ACK/NACK feedback is 0000 01101101, i.e. a HARQ ACK/NACK feedback result is 1000 0000 0110 1101, for a total of 16 bits. FIG. 4 is a diagram showing another joint feedback of a TB-level ACK/NACK and a CBG-level ACK/NACK provided in an embodiment of the present application, as shown in FIG. 4, a TB-level ACK/NACK feedback for HARQ processes 2, 5, 7, and 8 is 1000, a CBG-level ACK/NACK feedback for TB_2 for a HARQ process is 0000, a CBG-level ACK/NACK feedback for TB_3 is 0110, and a CBG-level ACK/NACK feedback for TB_4 is 1101.

In an embodiment, the HARQ ACK/NACK indication includes TB-level ACK/NACK information corresponding to a first HARQ process set and CBG-level ACK/NACK information corresponding to a third HARQ process set; the first HARQ process set includes one or more HARQ processes used by a scheduling-free transmission of the UE, the second HARQ process set is all HARQ processes with TB-level feedback being NACK in the first HARQ process set, and the third HARQ process set is a first preset number of HARQ processes with TB-level feedback being NACK in the second HARQ process set. The explanation of the second HARQ process set is described in the above embodiments, which will not be repeated here. The third HARQ process set is a subset of all HARQ processes in the second HARQ process set, a number of HARQ processes in the subset is a first preset number, and the HARQ processes in the subset are the first preset number of HARQ processes. Exemplarily, it is assumed that HARQ processes 2, 5, 7, and 8 are included in the first HARQ process set and that the TB-level feedback for the HARQ processes 5, 7, and 8 is NACK, then the second HARQ process set includes HARQ processes 5, 7, and 8; it is assumed that the first preset number is 2, the third HARQ process set includes HARQ processes 5 and 7.

For a HARQ process used by the UE for the scheduling-free transmission, the base station feeds back CBG-level ACK/NACK information simultaneously to the first preset number of (for example, recorded as n) processes with TB-level feedback being NACK; if the base station receives a PUSCH data transmission of the HARQ process, then the CBG-level ACK/NACK information is fed back according to a CBG-level decoding result, the ACK is fed back when the decoding is correct, and the NACK is fed back when the decoding is incorrect; and if the base station misses to detect the PUSCH data transmission of the HARQ process, then the CBG-level ACK/NACK information feedback is NACK. The first n processes may be arranged in an ascending/descending order according to the numberings of HARQ processes, and the first n processes are selected; or the HARQ processes may be arranged according to the transmission time sequence, the first n processes are taken. A value of n may be determined by one of following methods:

In an embodiment, the first preset number is configured by RRC signaling.

In an embodiment, the first preset number is a default value.

In an embodiment, the first preset number is determined by a number of CBGs in each TB, and the number of CBGs in the each TB is configured by RRC signaling. In an embodiment, the value of n may be implicitly indicated by other information in the RRC signaling. For example, the value of n may be implicitly informed by configuring a number of CBGs that each TB may be split in the RRC signaling, and if the number of CBGs that each TB may be split is {0, 2, 4, 6, 8}, then correspondingly, n may take the value of {0, 8, 4, 2, 2}. Exemplarily, the number of CBGs that each TB may be split is 6, and if a maximum value of a bit domain overhead of the CBG-level ACK/NACK feedback is 16, n takes a value of 2; as another example, if the number of CBGs that each TB may be split is 8, and the maximum value of a bit domain overhead of the CBG is 16, then n may also be 2. In an embodiment, in a case where a maximum value of a bit domain overhead of the CBG-level ACK/NACK feedback is 32, if the number of CBGs that each TB may be split is {0, 2, 4, 6, 8}, then correspondingly, n may take the value of {0, 16, 8, 5, 4}. In an embodiment, the maximum value of a bit domain overhead of the CBG-level ACK/NACK feedback is not limited, and may be adjusted according to actual conditions. In an embodiment, in a case where a number of HARQ processes with TB-level feedback being NACK is less than n, the insufficient CBG-level feedback is filled with the NACK.

Figure 5:
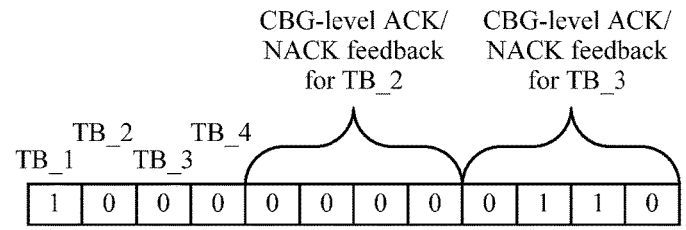
FIG. 5 is a diagram showing another joint feedback of a TB-level ACK/NACK and a CBG-level ACK/NACK provided in an embodiment of the present application.

Exemplarily, it is assumed that HARQ processes configured by the base station for the scheduling-free transmission of the UE are processes 1 to 8, and a number of split CBGs of each TB is configured to be 4, and n takes a value of 2. The UE transmits PUSCH data by using HARQ processes 2, 5, 7 and 8, and TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, and CBG_2 and CBG_3 are decoded correctly; TB_4 corresponding to the HARQ process 8 is incorrectly decoded, where CBG_3 of TB_4 is incorrectly decoded, and the remaining CBGs are decoded correctly, then the TB-level ACK/NACK feedback is 1000, and the CBG-level ACK/NACK feedback is 00000110, that is, a HARQ ACK/NACK feedback result is 100000000110, for a total of 12 bits. FIG. 5 is a diagram showing another joint feedback of a TB-level ACK/NACK and a CBG-level ACK/NACK provided in an embodiment of the present application. As shown in FIG. 5, a TB-level ACK/NACK feedback for HARQ processes 2, 5, 7, and 8 is 1000, that is, TB-level feedbacks of HARQ processes 5, 7, and 8 are all NACK, in an embodiment, n is 2, the first 2 HARQ processes with TB-level feedback being NACK are selected, that is, HARQ processes 5 and 7, that is, a CBG-level ACK/NACK feedback for TB_2 corresponding to the HARQ process 5 is 0000, and a CBG-level ACK/NACK feedback for TB_3 corresponding to the HARQ process 7 is 0110.

In an embodiment, the HARQ ACK/NACK indication includes TB-level ACK/NACK information corresponding to a first HARQ process set, a first bitmap, and CBG-level ACK/NACK information corresponding to a second HARQ process set; the first HARQ process set includes one or more HARQ processes used by a scheduling-free transmission of the UE, and the second HARQ process set is a subset of all HARQ processes with TB-level feedback being NACK in the first HARQ process set, and the first bitmap is configured for indicating a correspondence between each HARQ process included in the second HARQ process set and all HARQ processes with TB-level feedback being NACK in the first HARQ process. In an embodiment, for a HARQ process used by the UE for the scheduling-free transmission, the base station may indicate to feed back CBG-level ACK/NACK information for part of the HARQ processes in the first HARQ process set through indication information, and the indication information may be implemented through bitmap. In an embodiment, a HARQ process which feeds back or does not feed back the CBG-level ACK/NACK information may be directly indicated through the first bitmap, that is, a bit corresponding to the first bitmap is 1, and it is indicated that CBG-level ACK/NACK information is fed back for a corresponding HARQ process; and if a bit corresponding to the first bitmap is 0, it is indicated that CBG-level ACK/NACK information is not fed back for a corresponding HARQ process.

Figure 6:
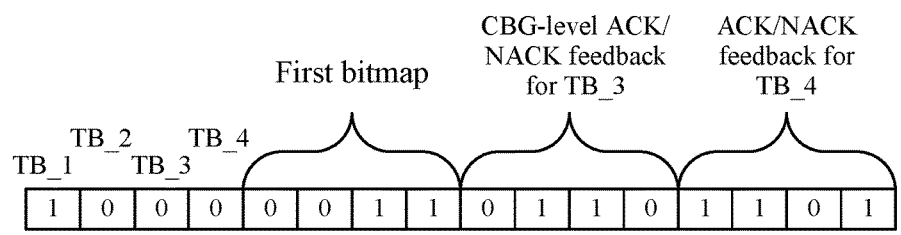
FIG. 6 is a diagram showing another joint feedback of a TB-level ACK/NACK and a CBG-level ACK/NACK provided in an embodiment of the present application.

Exemplarily, HARQ processes configured by the base station for the scheduling-free transmission of the UE are processes 1 to 8, and a number of split CBGs of each TB is configured to be 4, and n takes a value of 2. The UE transmits PUSCH data by using HARQ processes 2, 5, 7 and 8, and TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, and CBG_2 and CBG_3 are decoded correctly; TB_4 corresponding to the HARQ process 8 is incorrectly decoded, where CBG_3 of TB_4 is incorrectly decoded, and the remaining CBGs are decoded correctly. It is assumed that the base station feeds back CBG-level ACK/NACK for HARQ processes 7 and 8, the feedback is 1000 for TB-level ACK/NACK, it is indicated that the first bitmap feeding back CBG-level ACK/NACK for the processes 7 and 8 is 0011, and the feedback is 01101101 for CBG-level ACK/NACK, i.e., a HARQ ACK/NACK feedback result is 1000001101101101, for a total of 16 bits. FIG. 6 is a diagram showing another joint feedback of a TB-level ACK/NACK and a CBG-level ACK/NACK provided in an embodiment of the present application. As shown in FIG. 6, a TB-level ACK/NACK feedback for HARQ processes 2, 5, 7, and 8 is 1000, that is, TB-level feedbacks of HARQ processes 5, 7, and 8 are all NACK, in an embodiment, it is assumed that CBG-level ACK/NACK information is fed back for HARQ processes 7 and 8, the first bitmap is taken to be 0011, i.e., the CBG-level ACK/NACK feedback for TB_3 for the HARQ process 7 is 0110, and the CBG-level ACK/NACK feedback for TB_4 for the HARQ process 8 is 1101. The first bitmap is configured for indicating a HARQ process for feeding back the CBG-level ACK/NACK.

In an embodiment, the HARQ ACK/NACK indication includes TB-level ACK/NACK information corresponding to a first HARQ process set, a second bitmap, and CBG-level ACK/NACK information corresponding to a fourth HARQ process set; the first HARQ process set includes one or more HARQ processes used by a scheduling-free transmission of the UE, the fourth HARQ process set is all HARQ processes of which a proportion of a number of CBGs with CBG-level feedback being NACK is lower than a preset threshold value in the first HARQ process set, and the second bitmap is configured for indicating a correspondence between each HARQ process included in the fourth HARQ process set and a HARQ process in a first HARQ process set. In an embodiment, for a HARQ process with TB-level feedback being NACK, a proportion of a number of CBGs of which the CBG-level decoding feedback corresponding to the HARQ process is NACK exceeds a preset threshold value M or the PUSCH of the HARQ process is detected missingly, only the TB-level NACK information is fed back for the HARQ process, and CBG-level ACK/NACK information needs to be fed back in other situations. Exemplarily, HARQ processes configured by the base station for the scheduling-free transmission of the UE are processes 1 to 8, and a number of split CBGs of each TB is configured to be 4, and the preset threshold value is 50%. The UE transmits PUSCH data by using HARQ processes 2, 5, 7 and 8, and TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, and CBG_2 and CBG_3 are decoded correctly; TB_4 corresponding to the HARQ process 8 is incorrectly decoded, where CBG_3 of TB_4 is incorrectly decoded, and the remaining CBGs are decoded correctly. The base station feeds back HARQ ACK/NACK information for all HARQ processes used by a scheduling-free of the UE, and the feedback of TB-level ACK/NACKs for the HARQ processes 2, 5, 7 and 8 is 1000, that is, the TB-level feedback of the HARQ processes 5, 7 and 8 is NACK. In an embodiment, among the three HARQ processes (HARQ processes 5, 7, and 8) with TB-level feedback being NACK, only a number of CBGs with CBG-level feedback being NACK for the HARQ process 8 is below 50%, i.e. the fourth HARQ process set includes the HARQ process 8, in this case, the second bitmap is 0001, i.e., CBG-level ACK/NACK information is fed back for the HARQ process 8, and the CBG-level ACK/NACK feedback for the HARQ process 8 is 1101, while the remaining HARQ processes with TB-level feedback being NACK do not feed back CBG-level ACK/NACK information, and a final HARQ ACK/NACK feedback content is 1000 0001 1101.

In an embodiment, the base station configures, for the UE, an uplink scheduling-free resource and a HARQ process range used by the scheduling-free transmission, the UE may transmit PUSCH data by utilizing the uplink scheduling-free resource and a HARQ process, the base station receives and decodes the transmission of the scheduling-free PUSCH data in the scheduling-free resource, the base station feeds back the DFI information to the UE according to a receiving and decoding result of the PUSCH data, the DFI information includes a HARQ ACK/NACK indication, and the HARQ ACK/NACK indication is configured for receiving and decoding the PUSCH data. The HARQ ACK/NACK indication information is configured for performing a feedback indication on a decoding result of the HARQ process, and the HARQ ACK/NACK indication includes at least one of following information: TB-level decoding feedback indication information for the HARQ process and CBG-level decoding feedback indication information for the HARQ process.

For all HARQ processes configured to the scheduling-free transmission of the UE or all HARQ processes, when the base station receives PUSCH data transmitted by the UE through the HARQ process, TB-level ACK/NACK information and CBG-level ACK/NACK information are fed back for the HARQ processes according to decoding results of the received PUSCH data; if the base station does not receive PUSCH data transmitted by the UE through the HARQ process, a TB-level NACK is fed back for the HARQ process, and CBG-level ACK/NACK needs to be fed back, CBG-level NACK is fed back for all CBGs of the HARQ process at the same time, and the all HARQ processes are a maximum number of processes that may be used by the UE for a scheduling transmission and a scheduling-free transmission; TB-level ACK/NACK and CBG-level ACK/NACK feedback schemes for the HARQ process may include one of following.

In an embodiment, the HARQ ACK/NACK indication includes at least one of: TB-level ACK/NACK information corresponding to a fifth HARQ process set, or CBG-level ACK/NACK information corresponding to the fifth HARQ process set; the fifth HARQ process set includes all HARQ processes or one or more HARQ processes configured for a scheduling-free transmission of the UE, where the all HARQ processes are a maximum number of processes that may be used by the UE for a scheduling transmission and a scheduling-free transmission.

In an embodiment, the HARQ ACK/NACK indication includes TB-level ACK/NACK information corresponding to a fifth HARQ process set, that is, for all HARQ processes or all HARQ processes configured to the scheduling-free transmission of the UE, the base station only feeds back TB-level ACK/NACK information and does not feed back CBG-level ACK/NACK information.

In an embodiment, the HARQ ACK/NACK indication includes CBG-level ACK/NACK information corresponding to a fifth HARQ process set, that is, for all HARQ processes or all HARQ processes configured to the scheduling-free transmission of the UE, the base station only feeds back the CBG-level ACK/NACK information and does not feed back the TB-level ACK/NACK information.

Figure 7:
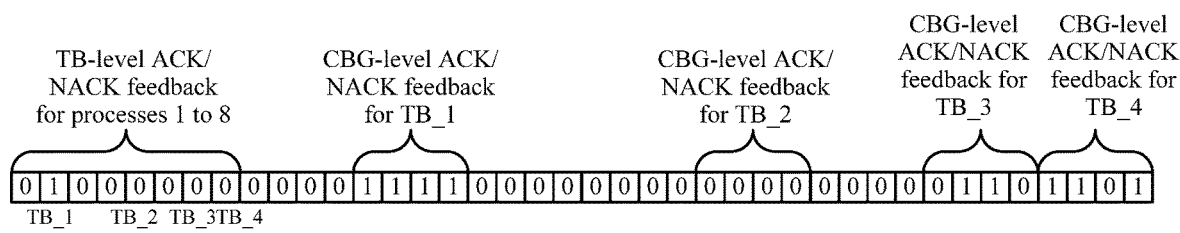
FIG. 7 is a diagram showing a joint feedback of a TB-level ACK/NACK and a CBG-level ACK/NACK for all HARQ processes configured for a scheduling-free transmission of UEs provided in an embodiment of the present application.

In an embodiment, the HARQ ACK/NACK indication includes TB-level ACK/NACK information corresponding to a fifth HARQ process set and CBG-level ACK/NACK information corresponding to the fifth HARQ process set, that is, the base station simultaneously feeds back the TB-level ACK/NACK information and the CBG-level ACK/NACK information for all HARQ processes or all HARQ processes configured to the scheduling-free transmission of the UE. Exemplarily, HARQ processes configured by the base station for the scheduling-free transmission of the UE are processes 1 to 8, a number of split CBGs of each TB is configured to be 4. The UE transmits PUSCH data by using HARQ processes 2, 5, 7 and 8, TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, CBG_2 and CBG_3 are decoded correctly; TB_4 corresponding to the HARQ process 8 is incorrectly decoded, where CBG_3 of TB_4 is incorrectly decoded, and the remaining CBGs are incorrectly decoded. HARQ ACK/NACK information fed back by the base station for all HARQ processes configured for the scheduling-free transmission is used as an example, a feedback for TB-level ACK/NACK is 0100 0000, a feedback for CBG-level ACK/NACK is 0000 1111 0000 0000 0000 0000 0110 1101, that is, a HARQ ACK/NACK feedback result is 0100 0000 0000 1111 0000 0000 0000 0000 0110 1101, for a total of 40 bits. FIG. 7 is a diagram showing a joint feedback of a TB-level ACK/NACK and a CBG-level ACK/NACK for all HARQ processes configured for a scheduling-free transmission of UEs provided in an embodiment of the present application. As shown in FIG. 7, a TB-level ACK is fed back for a correctly decoding HARQ process, a TB-level NACK is fed back for a incorrectly decoding or missing detected HARQ process, and a TB-level NACK and a CBG-level NACK are fed back for a HARQ process that does not receive PUSCH data, the TB-level ACK/NACK feedback for HARQ processes 1 to 8 is 0100 0000, i.e., the TB-level feedback for the HARQ process 2 is ACK, and the TB-level feedback for the remaining HARQ processes is NACK; the CBG-level ACK/NACK feedback for HARQ processes 1 to 8 is 0000 1111 0000 0000 0000 0000 0110 1101.

In an embodiment, the base station has the possibility that the detection of PUSCH data transmitted by the UE is missed, the base station feeds back HARQ ACK/NACK for all HARQ processes or all HARQ processes configured for the scheduling-free transmission, the base station is instructed to receive a HARQ process corresponding to the PUSCH data by using a bitmap, and the base station feeds back TB-level ACK/NACK for the HARQ process for a received PUSCH data decoding result and for the HARQ process, and the feedback method of the base station for the CBG-level ACK/NACK is one of following methods.

Figure 8:
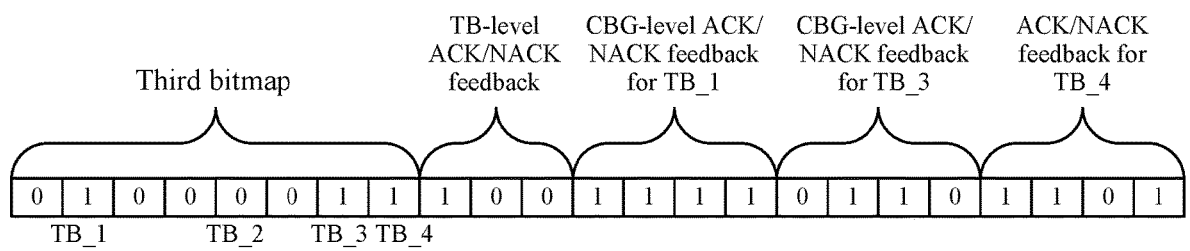
FIG. 8 is a diagram showing a joint feedback of a TB-level ACK/NACK and a CBG-level ACK/NACK carrying a third bitmap instruction receiving process provided in an embodiment of the present application.

In an embodiment, the HARQ ACK/NACK indication includes: a third bitmap, TB-level ACK/NACK information corresponding to a sixth HARQ process set, and CBG-level ACK/NACK information corresponding to the sixth HARQ process set; the third bitmap is configured for indicating one or more HARQ processes in a fifth HARQ process set included in the sixth HARQ process set, where the fifth HARQ process set includes: all HARQ processes or one or more HARQ processes configured for a scheduling-free transmission of the UE, the sixth HARQ process set is one or more HARQ processes corresponding to PUSCH data received by the base station in the fifth HARQ process set, and all HARQ processes are a maximum number of processes which may be configured for a scheduling transmission and a scheduling-free transmission of the UE. The third bitmap is configured for indicating all HARQ processes receiving the PUSCH data in the fifth HARQ process set. In an embodiment, for the HARQ process of the received PUSCH data, the base station feeds back TB-level ACK/NACK information and CBG-level ACK/NACK information of the HARQ process based on a decoding result, that is, the HARQ processes included in the sixth HARQ process set are all HARQ processes in the fifth HARQ process set for which the base station receives PUSCH data. Exemplarily, all HARQ processes configured by the base station for the scheduling-free transmission of the UE are processes 1 to 8, and a number of split CBGs of each TB is configured to be 4. The UE transmits PUSCH data by using HARQ processes 2, 5, 7, and 8, TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, CBG_2 and CBG_3 of TB_3 are decoded correctly; TB_4 corresponding to the HARQ process 8 is incorrectly decoded, where CBG_3 of TB_4 is incorrectly decoded, and the remaining CBGs are decoded correctly. HARQ ACK/NACK information fed back by the base station for all HARQ processes configured for the scheduling-free transmission of the UE is used as an example, a third bitmap corresponding to a HARQ process that instructs the base station to receive the PUSCH data is 010 00011, a feedback for TB-level ACK/NACK is 100, a feedback for CBG-level ACK/NACK is 1111 0110 1101, that is, a HARQ ACK/NACK feedback result is 0100 0011 100 1111 0110 1101, for a total of 23 bits. FIG. 8 is a diagram showing a joint feedback of a TB-level ACK/NACK and a CBG-level ACK/NACK carrying a third bitmap instruction receiving process provided in an embodiment of the present application. As shown in FIG. 8, the third bitmap is 01000011, that is, the HARQ process 2, the HARQ process 7, and the HARQ process 8 receive PUSCH data; a feedback for TB-level ACK/NACK is 100, that is, a TB corresponding to the HARQ process 2 is decoded correctly, and a TB corresponding to the HARQ processes 7 and 8 is incorrectly decoded; a feedback for CBG-level ACK/NACK is 111101101101, that is, the CBG-level ACK/NACK information is fed back to the three HARQ processes (including HARQ process 2, HARQ process 7, and HARQ process 8) receiving the PUSCH data.

Figure 9:
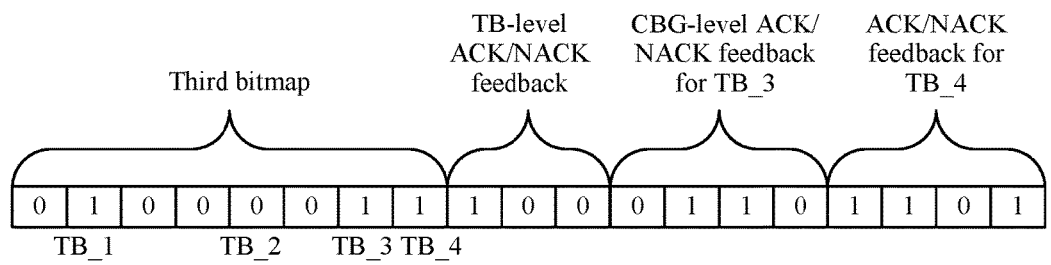
FIG. 9 is a diagram showing another joint feedback of a TB-level ACK/NACK and a CBG-level ACK/NACK carrying a third bitmap instruction receiving process provided in an embodiment of the present application.

In an embodiment, the HARQ ACK/NACK indication includes: a third bitmap, TB-level ACK/NACK information corresponding to a sixth HARQ process set, and CBG-level ACK/NACK information corresponding to a seventh HARQ process set; a fifth HARQ process set includes all HARQ processes or one or more HARQ processes configured for a scheduling-free transmission of the UE, the all HARQ processes are a maximum number of processes that may be used by the UE for a scheduling transmission and a scheduling-free transmission, the sixth HARQ process set is one or more HARQ processes corresponding to PUSCH data received by the base station in the fifth HARQ process set, the seventh HARQ process set is one or more HARQ processes with TB-level feedback being NACK in the sixth HARQ process set, and the third bitmap is configured for indicating one or more HARQ processes in the fifth HARQ process set included in the sixth HARQ process set. In an embodiment, for the HARQ process receiving the PUSCH data, the base station feeds back the TB-level ACK/NACK of the HARQ process based on the decoding result, and for the HARQ process with all TB-level feedbacks being NACK, the base station feeds back CBG-level ACK/NACK information by the HARQ process (i.e. the HARQ process with all TB-level feedbacks being NACK) at the same time. Exemplarily, HARQ processes configured by the base station for the scheduling-free transmission of the UE are processes 1 to 8, and a number of split CBGs of each TB is configured to be 4. The UE transmits PUSCH data by using HARQ processes 2, 5, 7 and 8, and TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, and CBG_2 and CBG_3 are decoded correctly; TB_4 corresponding to the HARQ process 8 is incorrectly decoded, where CBG_3 of TB_4 is incorrectly decoded, and the remaining CBGs are decoded correctly. HARQ ACK/NACK information fed back by the base station for all HARQ processes configured for the scheduling-free transmission of the UE is used as an example, a third bitmap corresponding to a HARQ process that instructs the base station to receive the PUSCH data is 010 00011, a feedback for TB-level ACK/NACK is 100, a feedback for CBG-level ACK/NACK is 0110 1101, that is, a HARQ ACK/NACK feedback result is 0100 0011 100 0110 1101, for a total of 19 bits. FIG. 9 is a diagram showing another joint feedback of a TB-level ACK/NACK and a CBG-level ACK/NACK carrying a third bitmap instruction receiving process provided in an embodiment of the present application. As shown in FIG. 9, the third bitmap is 0100 0011, that is, the HARQ process 2, the HARQ process 7, and the HARQ process 8 receive PUSCH data; a feedback for TB-level ACK/NACK is 100, that is, a TB corresponding to the HARQ process 2 is decoded correctly, and a TB corresponding to the HARQ processes 7 and 8 is incorrectly decoded; a feedback for CBG-level ACK/NACK is 0110 1101, that is, the CBG-level ACK/NACK information is fed back to a HARQ process (including HARQ process 7 and HARQ process 8) with TB-level feedback being NACK among three HARQ processes receiving the PUSCH data. In an embodiment, the HARQ ACK/NACK indication includes a third bitmap, TB-level ACK/NACK information corresponding to a sixth HARQ process set, and CBG-level ACK/NACK information corresponding to an eighth HARQ process set, and a fifth HARQ process set includes all HARQ processes or one or more HARQ processes configured for a scheduling-free transmission of the UE, the all HARQ processes are a maximum number of processes that may be used by the UE for a scheduling transmission and a scheduling-free transmission, and the sixth HARQ process set is one or more HARQ processes corresponding to PUSCH data received by the base station in the fifth HARQ process set, the third bitmap is configured for indicating one or more HARQ processes in the fifth HARQ process set included in the sixth HARQ process set, and the eighth HARQ process set is one or more HARQ processes with a first second preset number of HARQ processes with TB-level feedback being NACK in the sixth HARQ process set. In an embodiment, for all HARQ processes receiving the PUSCH data, the base station feeds back TB-level ACK/NACK of the HARQ process based on a decoding result, and for a process in which the first second preset number (for example, m) of TB-level feedbacks is NACK, the base station simultaneously feeds back CBG-level ACK/NACK information for the HARQ process. The first second preset number (the first m) of HARQ processes may be arranged in ascending/descending order according to the numberings of HARQ processes, and the first m HARQ processes are selected; the HARQ processes may also be arranged according to the transmission time, and the first m HARQ processes are taken, which is not limited here.

In an embodiment, the second preset number is configured by RRC information.

In an embodiment, the second preset number is a default value.

In an embodiment, the second preset number is determined by a number of CBGs in each TB, and the number of CBGs in the each TB is configured by RRC signaling. In an embodiment, the value of m may be implicitly indicated by other information in the RRC signaling, for example, the value of n may be implicitly informed by configuring a number of CBGs that each TB may be split in the RRC signaling, for example, the number of CBGs that each TB may be split is {0, 2, 4, 6, 8}, then correspondingly, m may take the value of {0, 8, 4, 2, 2}. The explanation of the second preset number m is the same as the explanation of the first preset number n in the above embodiments, and reference may be made to the description of the above embodiment, which will not be repeated here.

In an embodiment, when a number of HARQ processes with TB-level feedback being NACK is less than n, the insufficient CBG-level feedback is filled with NACK, that is, may be filled with 0.

Figure 10:
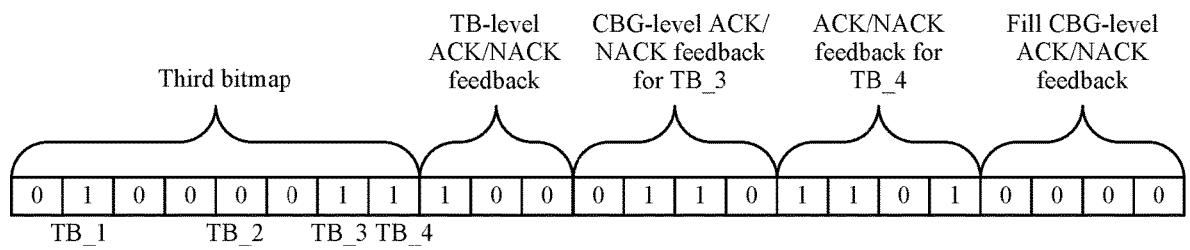
FIG. 10 is a diagram showing a another joint feedback of a TB-level ACK/NACK and a CBG-level ACK/NACK carrying a third bitmap instruction receiving process provided in an embodiment of the present application.

Exemplarily, HARQ processes configured by the base station for the scheduling-free transmission of the UE are processes 1 to 8, and a number of split CBGs of each TB is configured to be 4, and a value of m is 3. The UE transmits PUSCH data by using HARQ processes 2, 5, 7 and 8, and TB 1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, and CBG_2 and CBG_3 are decoded correctly; TB_4 corresponding to the HARQ process 8 is incorrectly decoded, where CBG_3 of TB_4 is incorrectly decoded, and the remaining CBGs are decoded correctly. HARQ ACK/NACK information fed back by the base station for all HARQ processes configured for the scheduling-free transmission of the UE is used as an example, a third bitmap corresponding to a HARQ process that instructs the base station to receive the PUSCH data is 0100 0011, a feedback for TB-level ACK/NACK is 100, a feedback for CBG-level ACK/NACK is 0110 1101 0000, that is, a HARQ ACK/NACK feedback result is 0100 0011 100 0110 1101 0000, for a total of 23 bits. FIG. 10 is a diagram showing a another joint feedback of a TB-level ACK/NACK and a CBG-level ACK/NACK carrying a third bitmap instruction receiving process provided in an embodiment of the present application. As shown in FIG. 10, the third bitmap is 0100 0011, that is, the HARQ process 2, the HARQ process 7, and the HARQ process 8 receive PUSCH data; a feedback for TB-level ACK/NACK is 100, that is, a TB corresponding to the HARQ process 2 is decoded correctly, and a TB corresponding to the HARQ processes 7 and 8 is incorrectly decoded; m is 3, that is, the CBG-level ACK/NACK information is fed back to first 3 HARQ processes with TB-level feedback being NACK among three HARQ processes receiving the PUSCH data. In an embodiment, the TB-level feedback of only two HARQ processes of the three HARQ processes receiving the PUSCH data is NACK, that is, a number of HARQ processes with TB-level feedback being NACK is less than m (that is, less than 3), the insufficient part of CBG-level feedback is filled with the NACK, that is, a feedback for CBG-level ACK/NACK is 0110 1101 0000.

In an embodiment, the base station configures, for the UE, an uplink scheduling-free resource and a HARQ process range used by the scheduling-free transmission, the UE may transmit PUSCH data by utilizing the uplink scheduling-free resource and a HARQ process, the base station receives and decodes the transmission of the scheduling-free PUSCH data in the scheduling-free resource, the base station feeds back the DFI information to the UE according to a receiving and decoding result of the PUSCH data, the DFI information includes a HARQ ACK/NACK indication, and the HARQ ACK/NACK indication is configured for receiving and decoding the PUSCH data. The HARQ ACK/NACK indication information is configured for performing a feedback indication on a decoding result of the HARQ process, and the HARQ ACK/NACK indication includes at least one of following information: TB-level decoding feedback indication information for the HARQ process and CBG-level decoding feedback indication information for the HARQ process.

For all HARQ processes configured to the scheduling-free transmission of the UE or all HARQ processes, when the base station receives PUSCH data transmitted by the UE through the HARQ process, TB-level ACK/NACK information is fed back for the processes according to decoding results of the received PUSCH data; if the base station does not receive PUSCH data transmitted by the UE through the HARQ process, TB-level NACK information is fed back for the HARQ process, and for a HARQ process with TB-level feedback being NACK in the HARQ process, the base station indicates a HARQ process of CBG-level ACK/NACK information needs to be reported and reports the CBG-level ACK/NACK information of the HARQ process. In an embodiment, the HARQ ACK/NACK indication includes: TB-level ACK/NACK information corresponding to a fifth HARQ process set, a process number indication, and CBG-level ACK/NACK information corresponding to a seventh HARQ process set; where the process number indication is configured for indicating one or more HARQ processes included in the seventh HARQ process set, the fifth HARQ process set includes all HARQ processes or one or more HARQ processes configured for a scheduling-free transmission of the UE, and the all HARQ processes are a maximum number of processes that may be used by the UE for a scheduling transmission and a scheduling-free transmission, and a sixth HARQ process set is one or more HARQ processes corresponding to PUSCH data received by the base station in the fifth HARQ process set, and the seventh HARQ process set is one or more HARQ processes with TB-level feedback being NACK in the sixth HARQ process set.

Figure 11:
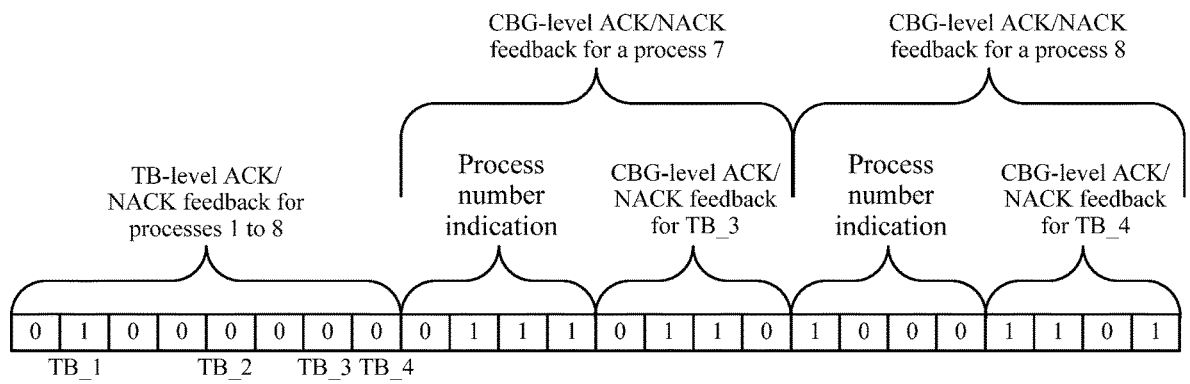
FIG. 11 is a diagram showing a joint feedback of a TB-level ACK/NACK and a CBG-level ACK/NACK carrying a process number indication provided in an embodiment of the present application.

Exemplarily, HARQ processes configured by the base station for the scheduling-free transmission of the UE are processes 1 to 8, and a number of split CBGs of each TB is configured to be 4, and a value of n is 3. The UE transmits PUSCH data by using HARQ processes 2, 5, 7 and 8, and TB_1 corresponding to the HARQ process 2 is decoded correctly; the detection of TB_2 corresponding to the HARQ process 5 is missed; TB_3 corresponding to the HARQ process 7 is incorrectly decoded, where CBG_1 and CBG_4 of TB_3 are incorrectly decoded, and CBG_2 and CBG_3 are decoded correctly; TB_4 corresponding to the HARQ process 8 is incorrectly decoded, where CBG_3 of TB_4 is incorrectly decoded, and the remaining CBGs are decoded correctly. HARQ ACK/NACK information fed back by the base station for all HARQ processes configured for the scheduling-free transmission of the UE is used as an example, a feedback for TB-level ACK/NACK is 100, a CBG-level ACK/NACK feedback for TB_3 is 0111 0110, and a CBG-level ACK/NACK feedback for TB_4 is 1000 1101, i.e., a HARQ ACK/NACK feedback result is 0100 0000 0111 0110 1000 1101, for a total of 24 bits. FIG. 11 is a diagram showing a joint feedback of a TB-level ACK/NACK and a CBG-level ACK/NACK carrying a process number indication provided in an embodiment of the present application. As shown in FIG. 11, for a TB-level ACK/NACK feedback is 0100 0000, i.e., a TB corresponding to the HARQ process 2 is decoded correctly, and TBs corresponding to the other HARQ processes are incorrectly decoded, the CBG-level ACK/NACK information may be fed back to the other 7 HARQ processes except the HARQ process 2. In an embodiment, the base station indicates that HARQ processes needing to report the CBG-level ACK/NACK information are the HARQ process 7 and the HARQ process 8, then a process number indication in the CBG-level ACK/NACK information for the HARQ process 7 is 0111, and a process number indication in the CBG-level ACK/NACK information for the HARQ process 8 is 1000. Where the CBG-level ACK/NACK information for the HARQ process 7 is 0110 and the CBG-level ACK/NACK information for the HARQ process 8 is 1101, i.e., a CBG-level ACK/NACK feedback for TB_3 corresponding to the HARQ process 7 is 0111 0110, and a CBG-level ACK/NACK feedback for TB_4 corresponding to the HARQ process 8 is 1000 1101.

In an embodiment, the base station configures, for the UE, an uplink scheduling-free resource and a HARQ process range used by the scheduling-free transmission, the UE may transmit PUSCH data by utilizing the uplink scheduling-free resource and a HARQ process, the base station receives and decodes the transmission of the scheduling-free PUSCH data in the scheduling-free resource, the base station feeds back the DFI information to the UE according to a receiving and decoding result of the PUSCH data, the DFI is one of the DCI, and a bit domain overhead of the DFI is kept consistent with a bit domain overhead of one DCI in a current DCI format. Where the DFI includes HARQ ACK/NACK indication information, the HARQ ACK/NACK indication information performs a feedback indication for a HARQ process decoding result, and the HARQ ACK/NACK indication includes at least one of following information: TB-level decoding feedback indication information for the HARQ process, or CBG-level decoding feedback indication information for the HARQ process.

The bit domain overhead of the DFI needs to be kept consistent with the bit domain overhead of the one DCI in the current DCI format, the bit domain overhead of the DFI is limited by a maximum value, that is, the bit domain overhead for feeding back the CBG-level ACK/NACK is limited by the maximum value, and under this limiting condition, when the feedback overhead of 1 bit DFI occupied by each CBG needing to feed back the CBG-level ACK/NACK cannot be satisfied, a CBG-level ACK/NACK feedback may be achieved through a CBG binding, and the CBG binding is that multiple CBG decoding results are fed back by using 1-bit ACK/NACK feedback overhead, when all CBGs in a same CBG binding are decoded correctly, ACK is fed back for the CBG binding, and the feedback for the CBG binding in other cases is NACK.

In an embodiment, in a case where a number of CBGs is larger than the maximum value of a bit domain overhead, CBG-level ACK/NACK information is fed back by adopting the CBG binding, the number of CBGs is a product of a number of TBs feeding back the CBG-level ACK/NACK information and a number of CBGs split by each TB, and the maximum value of a bit domain overhead is a maximum value of the DFI bit domain overhead corresponding to the feedback of the CBG-level ACK/NACK. In an embodiment, the maximum value of a bit domain overhead of the CBG-level ACK/NACK feedback is recorded as CBGlevelHARQsize, a number of TBs needing to feed back the CBG-level ACK/NACK information is recorded as numTB, a number of CBGs which may be split by each TB configured by RRC signaling is recorded as numCBGPerTB, when numCBGPerTB>⌊CBGlevelHARQsize/numTB⌋, the CBG-level ACK/NACK information needs to be fed back by means of the CBG binding, and otherwise, the CBG-level ACK/NACK feedback only needs to be performed for each CBG.

In an embodiment, the CBG binding includes: a first bit is employed to feed back CBG-level ACK/NACK information corresponding to a first third preset number of TBs; and a second bit is employed to feed back CBG-level ACK/NACK information corresponding to a first fourth preset number of TBs. Where a sum of the third preset number and the fourth preset number is the number of TBs of the fed back CBG-level ACK/NACK information, and the third preset number is a residual value between the maximum value of a bit domain overhead and the number of TBs of the fed back CBG-level ACK/NACK information. The first bit is a value obtained by rounding up a ratio between the maximum value of a bit domain overhead and the number of TBs of the fed back CBG-level ACK/NACK information, and the second bit is a value obtained by rounding down a ratio between the maximum value of a bit domain overhead and the number of TBs of the fed back CBG-level ACK/NACK information.

In an embodiment, a feedback scheme of the CBG binding may be that: the CBG-level ACK/NACK feedback corresponding to first x=CBGlevelHARQsize mod numTB TBs is fed back by using y=⌈CBGlevelHARQsize/numTB⌉ bits, that is, a feedback rule of the CBG-level binding feedback ACK/NACK corresponding to the first x TBs is that: the first k=numCBGPerTB mod y binding is a binding of ⌈numCBGPerTB/y⌉ CBGs, and the remaining (y−k) binding is a binding of ⌊numCBGPerTB/y⌋ CBGs; the CBG-level ACK/NACK feedback corresponding to the remaining (numTB−x) TBs is fed back by using y'=⌊CBGlevelHARQsize/numTB⌋ bits, that is, a feedback rule of the CBG-level binding feedback ACK/NACK corresponding to the remaining (numTB−x) TBs is that: the first k'=numCBGPerTB mod y' binding is a binding of ⌈numCBGPerTB/y'⌉ CBGs, and the remaining (y'−k') binding is a binding of ⌊numCBGPerTB/y⌋ CBGs.

Exemplarily, the maximum value of a bit domain overhead of the CBG-level ACK/NACK feedback is CBGlevelHARQsize=16, if numTB=3, numCBGPerTB=8, then it satisfies numCBGPerTB>⌊CBGlevelHARQsize/numTB⌋. In this case, CBG-level ACK/NACK information needs to be fed back by means of a CBG binding, the binding rules are as follows. y=⌈CBGlevelHARQsize/numTB⌉=6 bits is configured for CBG-level ACK/NACK feedback corresponding to the first x=CBGlevelHARQsize mod numTB=1 TBs to perform the feedback; a binding rule of CBG-level ACK/NACK corresponding to the front x=1 TB is that: first k=numCBGPerTB mod y=2 binding is a binding of ⌈numCBGPerTB/y⌉=2 CBGs, the remaining y−k=4 binding is a binding of ⌊numCBGPerTB/y⌋=1 CBG, that is, for the first TB needing to feed back the CBG-level ACK/NACK, the CBG-level ACK/NACK is fed back by using 6 bits, each bit is fed back for 1 CBG binding, and sizes of the 6 bindings corresponding to the first TB needing to feed back the CBG-level ACK/NACK are respectively 2, 2, 1, 1, 1 and 1.

Figure 12:
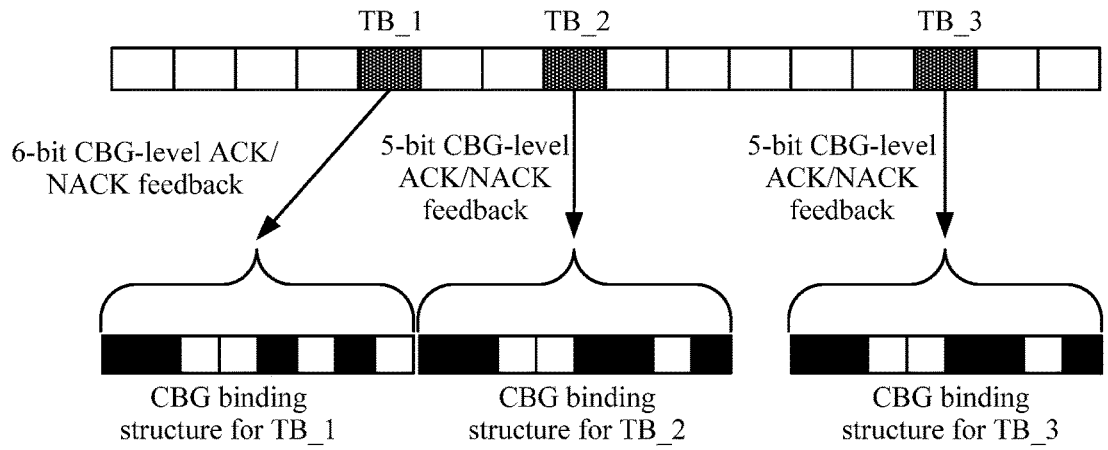
FIG. 12 is a structural diagram of a binding feedback of a CBG-level ACK/NACK provided in an embodiment of the present application.

A CBG-level ACK/NACK feedback corresponding to the next numTB−x=2 TBs uses y'=⌊CBGlevelHARQsize/numTB⌋=5 bits to perform the feedback, a binding rule of a CBG-level ACK/NACK corresponding to a next numTB−x=2 TBs is as follows: the first k'=numCBGPerTB mod y'=3 bindings are a binding of ⌈numCBGPerTB/y'⌉=2 CBGs, and the remaining y'−k'=2 binding is a binding of ⌊numCBGPerTB/y⌋=1 CBG, that is, for the second and third TBs needing to feed back the CBG-level ACK/NACK, the CBG-level ACK/NACK is fed back by using 5 bits, each bit is fed back for 1 CBG binding, and sizes of 5 binds corresponding to the second and third TBs needing to feed back the CBG-level ACK/NACK are respectively 2, 2, 2, 1 and 1. FIG. 12 is a structural diagram of a binding feedback of a CBG-level ACK/NACK provided in an embodiment of the present application. As shown in FIG. 12, 6 binding sizes corresponding to TB_1 are respectively 2, 2, 1, 1, 1, 1; 5 bundling sizes corresponding to TB_2 and TB_3 are 2, 2, 2, 1, 1, respectively, and the bundling structure is shown in FIG. 12.

Figure 13:
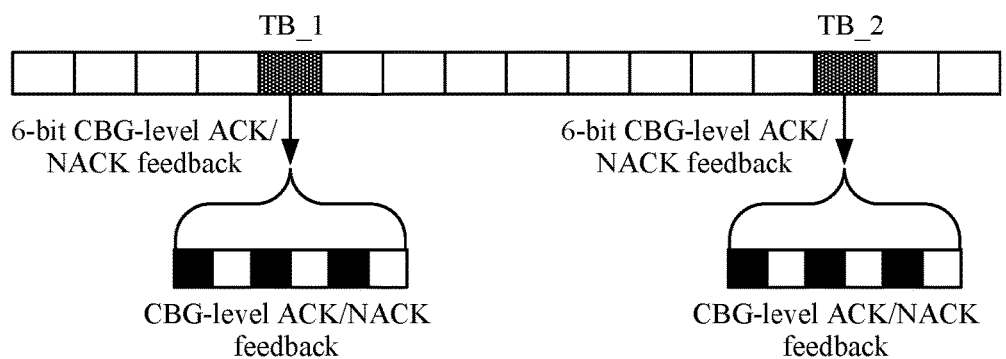
FIG. 13 is a structural diagram of another binding feedback of a CBG-level ACK/NACK provided in an embodiment of the present application.

Exemplarily, the maximum value of a bit domain overhead of the CBG-level ACK/NACK feedback is CBGlevelHARQsize=16, if numTB=2, numCBGPerTB=6, then it satisfies numCBGPerTB<⌊CBGlevelHARQsize/numTB⌋, and in this case, CBG-level ACK/NACK information does not need to be fed back by means of CBG binding. FIG. 13 is a structural diagram of another binding feedback of a CBG-level ACK/NACK provided in an embodiment of the present application. As shown in FIG. 13, the CBG-level ACK/NACK is fed back for each CBG directly using the first 12 bits of 16 bits.

Figure 14:
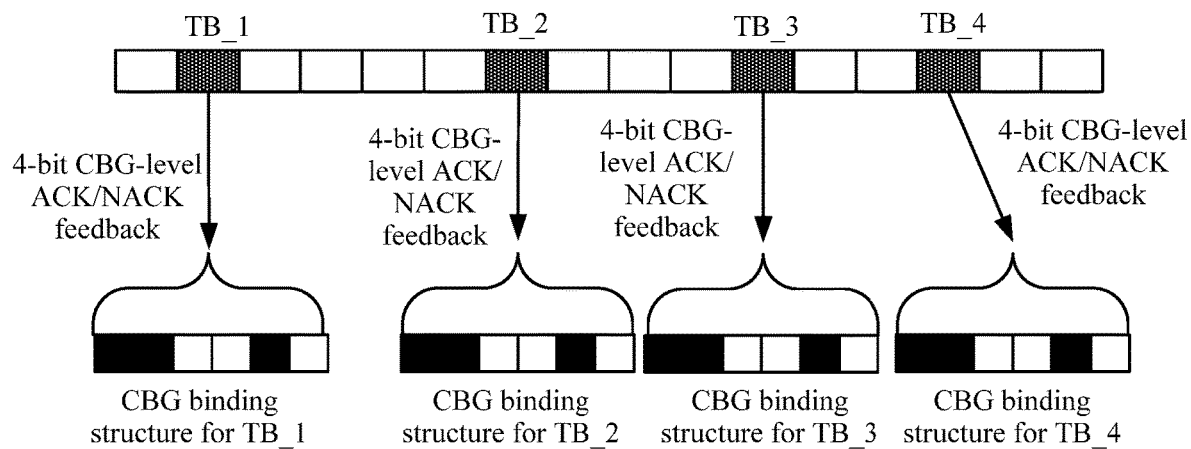
FIG. 14 is a structural diagram of another binding feedback of a CBG-level ACK/NACK provided in an embodiment of the present application.

Exemplarily, the maximum value of a bit domain overhead of the CBG-level ACK/NACK feedback is CBGlevelHARQsize=16, if numTB=4, numCBGPerTB=6, then it satisfies numCBGPerTB>⌊CBGlevelHARQsize/numTB⌋, and in this case, CBG-level ACK/NACK information does not need to be fed back by means of CBG binding. FIG. 14 is a structural diagram of another binding feedback of a CBG-level ACK/NACK provided in an embodiment of the present application. As shown in FIG. 14, the CBG-level ACK/NACK information is fed back using 4 bits for each TB, a number of CBGs corresponding to a CBG binding for each TB is 2, 2, 1, 1, and the CBG binding structure is shown in FIG. 14.

Figure 15:
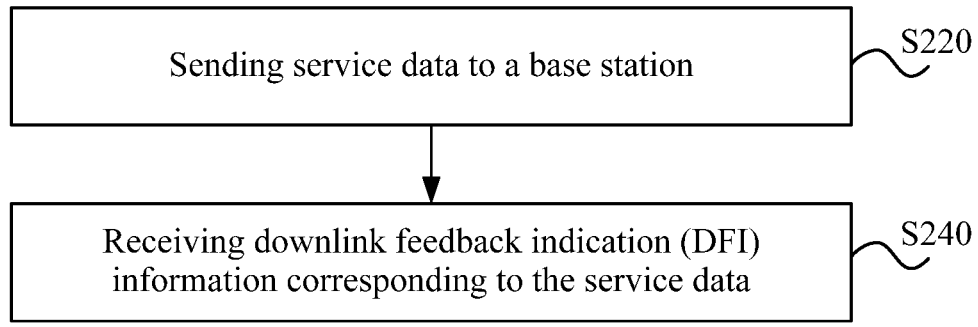
FIG. 15 is a flowchart of a method for receiving feedback information provided in an embodiment of the present application.

FIG. 15 is a flowchart of a method for receiving feedback information provided in an embodiment of the present application. This embodiment is suitable for a case of receiving joint decoding results of different scheduling granularities fed back by a base station, and this embodiment may be executed by a UE.

As shown in FIG. 15, the method provided in this embodiment includes following.

In S220, service data is sent to the base station.

In S240, downlink feedback indication (DFI) information corresponding to the service data is received.

The DFI information includes a HARQ ACK/NACK indication, and the HARQ ACK/NACK indication is configured for indicating a decoding result of the base station on a transport block (TB) and/or a code block group (CBG) in the service data. In an embodiment, the service data may include PUSCH data, the base station configures an uplink scheduling-free resource and a HARQ process range used by a scheduling-free transmission for the UE, the UE may transmit the PUSCH data to the base station by utilizing the uplink scheduling-free resource and a HARQ-level process. The base station receives and decodes PUSCH data for a scheduling-free transmission on the scheduling-free resource, and the base station feeds back the DFI information to the UE according to the receiving and decoding result of the PUSCH data.

In an embodiment, the DFI information further includes at least one of: a downlink control information (DCI) usage marking, a carrier indication, a BWP indication, a precoding information indication, a TPC indication, a MCS, or a RI. Where the DCI usage marking is configured for indicating that a usage currently represented by a piece of DCI is a feedback of a DFI or an activation/deactivation of an uplink scheduling-free resource, the carrier indication is configured for indicating that the DCI is effective for a carrier corresponding to a carrier index, and the BWP indication is configured for indicating that the DCI is effective for a BWP corresponding to a BWP index. For the explanation of each parameter in the DFI information, reference is made to the description of the above embodiment, which will not be repeated here.

In an embodiment, the method for receiving the feedback information further includes: determining a time interval between completion of reception of the service data and completion of preparation of the DFI information; and determining a feedback effectiveness of the DFI information according to the time interval.

In an embodiment, the determining the feedback effectiveness of the DFI information according to the time interval includes: for a HARQ process, in a case where the time interval is larger than or equal to N symbols or slots, the DFI information for the HARQ process being an effective feedback; for a HARQ process, in a case where the time interval is less than N symbols or slots, the DFI information for the HARQ process being an ineffective feedback. Where N is configured through RRC signaling configuration or is determined according to a subcarrier interval transmitted by a physical uplink shared channel (PUSCH). In an embodiment, the feedback effectiveness of the DFI information may be determined directly according to a time interval between completion of sending of the service data by the UE and reception of the DFI information. In a case where the time interval is less than N symbols or slots, a feedback of the DFI information is ineffective; and in a case where the interval is greater than or equal to N symbols or slots, the feedback of the DFI information is effective.

In an embodiment, the service data includes PUSCH data, the PUSCH data includes uplink control information (UCI), the UCI includes an uplink assignment index (UAI), and the UAI is configured for counting PUSCH data sent by the UE. In an embodiment, the PUSCH data sent by the UE is counted through the UAI, so that the base station may determine whether a missed detection of the PUSCH data exists according to the UAI information. When HARQ ACK/NACK is fed back, the decoding feedback for the PUSCH data transmission in the missed detection HARQ process is NACK.

In an embodiment, the HARQ ACK/NACK indication includes at least one of: TB-level decoding feedback indication information corresponding to a HARQ process, or CBG-level decoding feedback indication information corresponding to a HARQ process. In an embodiment, in order to feed back decoding results of the TB and the CBG of the HARQ process, the HARQ ACK/NACK indication includes at least TB-level decoding feedback indication information of the HARQ process and/or CBG-level decoding feedback indication information of the HARQ process. The TB-level decoding feedback indication information is configured for indicating decoding feedback information of a TB corresponding to the HARQ process; the CBG-level decoding feedback indication information is configured for indicating decoding feedback information of a CBG corresponding to the HARQ process. The explanation of the TB-level decoding feedback indication information and the CBG-level decoding feedback indication information, and the indication information included in the TB-level decoding feedback indication information and the CBG-level decoding feedback indication information are described in the above embodiments, which will not be repeated here.

Figure 16:
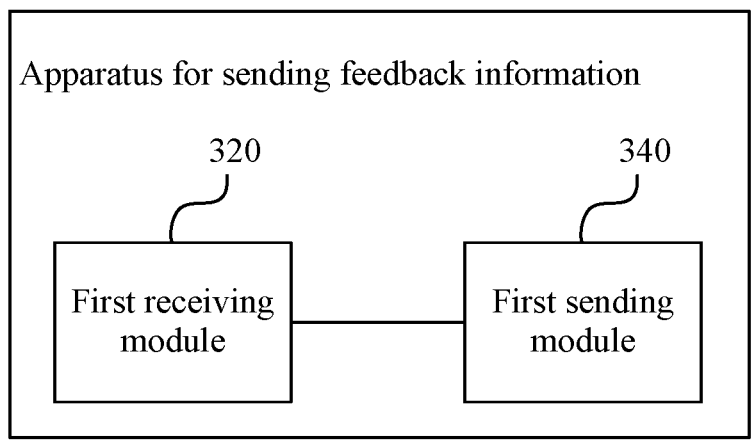
FIG. 16 is a block diagram of an apparatus for sending feedback information provided in an embodiment of the present application.

FIG. 16 is a block diagram of an apparatus for sending feedback information provided in an embodiment of the present application. As shown in FIG. 16, the apparatus for sending the feedback information provided in this embodiment includes a first receiving module 320 and a first sending module 340. The first receiving module 320 is configured to receive service data sent by a user equipment (UE). The first sending module 340 is configured to send downlink feedback indication (DFI) information corresponding to the service data to the UE, where the DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

The apparatus for sending the feedback information provided in this embodiment is configured to implement the method for sending the feedback information according to the embodiment shown in FIG. 1, and the implementation principle and technical effects of the apparatus for sending the feedback information provided in this embodiment are similar, which will not be repeated here.

In an embodiment, the DFI information further includes at least one of: a downlink control information (DCI) usage marking, a carrier indication, a bandwidth part (BWP) indication, a precoding information indication, a transmission power control (TPC) indication, a modulation and coding scheme (MCS), or a rank indication (RI). Where the DCI usage marking is configured for indicating that a usage currently represented by a piece of DCI is a feedback of a DFI or an activation/deactivation of an uplink scheduling-free resource, the carrier indication is configured for indicating that the DCI is effective for a carrier corresponding to a carrier index, and the BWP indication is configured for indicating that the DCI is effective for a BWP corresponding to a BWP index.

In an embodiment, the method for sending the feedback information further includes: determining a time interval between completion of reception of the service data and completion of preparation of the DFI information; and determining a feedback effectiveness of the DFI information according to the time interval.

In an embodiment, the determining the feedback effectiveness of the DFI information according to the time interval includes: in a case where the time interval is larger than or equal to N symbols or slots, the DFI information being an effective feedback; and in a case where the time interval is less than N symbols or slots, the DFI information being an ineffective feedback. Where N is configured through radio resource control (RRC) signaling configuration or is determined according to a subcarrier interval transmitted by a physical uplink shared channel (PUSCH).

In an embodiment, the service data includes PUSCH data, the PUSCH data includes uplink control information (UCI), the UCI includes an uplink assignment index (UAI), and the UAI is configured for counting PUSCH data sent by the UE.

In an embodiment, the method for sending the feedback information further includes: a missed detection of the PUSCH data is determined according to the UAI.

In an embodiment, the HARQ ACK/NACK indication includes at least one of: TB-level decoding feedback indication information corresponding to a HARQ process, or CBG-level decoding feedback indication information corresponding to a HARQ process.

In an embodiment, the HARQ ACK/NACK indication includes at least one of: TB-level ACK/NACK information corresponding to a first HARQ process set, or CBG-level ACK/NACK information corresponding to a first HARQ process set. Where the first HARQ process set includes one or more HARQ processes used by a scheduling-free transmission of the UE.

In an embodiment, the HARQ ACK/NACK indication includes TB-level ACK/NACK information corresponding to a first HARQ process set and CBG-level ACK/NACK information corresponding to a second HARQ process set. The first HARQ process set includes one or more HARQ processes used by a scheduling-free transmission of the UE, and the second HARQ process set includes all HARQ processes with TB-level feedback being NACK in the first HARQ process set.

In an embodiment, the HARQ ACK/NACK indication includes TB-level ACK/NACK information corresponding to a first HARQ process set and CBG-level ACK/NACK information corresponding to a third HARQ process set. The first HARQ process set includes one or more HARQ processes used by a scheduling-free transmission of the UE, the second HARQ process set includes all HARQ processes with TB-level feedback being NACK in the first HARQ process set, and the third HARQ process set includes a first preset number of HARQ processes with TB-level feedback being NACK in the second HARQ process set.

In an embodiment, the first preset number is configured by radio resource control (RRC) information.

In an embodiment, the first preset number is determined by a number of CBGs in each TB, and the number of CBGs in the each TB is configured by RRC signaling.

In an embodiment, the first preset number is a default value.

In an embodiment, the HARQ ACK/NACK indication includes TB-level ACK/NACK information corresponding to a first HARQ process set, a first bitmap, and CBG-level ACK/NACK information corresponding to a second HARQ process set. The first HARQ process set includes one or more HARQ processes used by a scheduling-free transmission of the UE, and the second HARQ process set is a subset of all HARQ processes with TB-level feedback being NACK in the first HARQ process set, and the first bitmap is configured for indicating a correspondence between each HARQ process included in the second HARQ process set and all HARQ processes with TB-level feedback being NACK in the first HARQ process.

In an embodiment, the HARQ ACK/NACK indication includes TB-level ACK/NACK information corresponding to a first HARQ process set, a second bitmap, and CBG-level ACK/NACK information corresponding to a fourth HARQ process set. The first HARQ process set includes one or more HARQ processes used by a scheduling-free transmission of the UE, the fourth HARQ process set is a subset of all HARQ processes of which a proportion of a number of CBGs with CBG-level feedback being NACK is lower than a preset threshold value in the first HARQ process set, and the second bitmap is configured for indicating a correspondence between each HARQ process included in the fourth HARQ process set and all HARQ processes of which a proportion of a number of CBGs with CBG-level feedback being NACK is lower than a preset threshold value in the first HARQ process set.

In an embodiment, the HARQ ACK/NACK indication includes at least one of: TB-level ACK/NACK information corresponding to a fifth HARQ process set, or CBG-level ACK/NACK information corresponding to the fifth HARQ process set. The fifth HARQ process set includes all HARQ processes or one or more HARQ processes configured for a scheduling-free transmission of the UE, where the all HARQ processes are a maximum number of processes that may be used by the UE for a scheduling transmission and a scheduling-free transmission.

In an embodiment, the HARQ ACK/NACK indication includes: a third bitmap, TB-level ACK/NACK information corresponding to a sixth HARQ process set, and CBG-level ACK/NACK information corresponding to the sixth HARQ process set. The third bitmap is configured for indicating one or more HARQ processes in a fifth HARQ process set included in the sixth HARQ process set, and the fifth HARQ process set includes all HARQ processes or one or more HARQ processes configured for a scheduling-free transmission of the UE, the sixth HARQ process set includes one or more HARQ processes corresponding to PUSCH data received by the base station in the fifth HARQ process set, and the all HARQ processes are a maximum number of processes that may be used by the UE for a scheduling transmission and a scheduling-free transmission.

In an embodiment, the HARQ ACK/NACK indication includes a third bitmap, TB-level ACK/NACK information corresponding to a sixth HARQ process set, and CBG-level ACK/NACK information corresponding to a seventh HARQ process set. A fifth HARQ process set includes all HARQ processes or one or more HARQ processes configured for a scheduling-free transmission of the UE, and the all HARQ processes are a maximum number of processes that may be used by the UE for a scheduling transmission and a scheduling-free transmission. The sixth HARQ process set includes one or more HARQ processes corresponding to PUSCH data received by the base station in the fifth HARQ process set, and the seventh HARQ process set is one or more HARQ processes with TB-level feedback being NACK in the sixth HARQ process set, and the third bitmap is configured for indicating one or more HARQ processes in the fifth HARQ process set included in the sixth HARQ process set.

In an embodiment, the HARQ ACK/NACK indication includes a third bitmap, TB-level ACK/NACK information corresponding to a sixth HARQ process set, and CBG-level ACK/NACK information corresponding to an eighth HARQ process set. A fifth HARQ process set includes all HARQ processes or one or more HARQ processes configured for a scheduling-free transmission of the UE, the all HARQ processes are a maximum number of processes that may be used by the UE for a scheduling transmission and a scheduling-free transmission, and the sixth HARQ process set is one or more HARQ processes corresponding to PUSCH data received by the base station in the fifth HARQ process set. The third bitmap is configured for indicating one or more HARQ processes in the fifth HARQ process set included in the sixth HARQ process set, and the eighth HARQ process set is one or more HARQ processes with a first second preset number of HARQ processes with TB-level feedback being NACK in the sixth HARQ process set.

In an embodiment, the second preset number is configured by RRC signaling.

In an embodiment, the second preset number is determined by a number of CBGs in each TB, and the number of CBGs in the each TB is configured by RRC signaling.

In an embodiment, the second preset number is a default value.

In an embodiment, the HARQ ACK/NACK indication includes TB-level ACK/NACK information corresponding to a fifth HARQ process set, a process number indication, and CBG-level ACK/NACK information corresponding to a seventh HARQ process set. Where the process number indication is configured for indicating one or more HARQ processes included in the seventh HARQ process set, the fifth HARQ process set includes all HARQ processes or one or more HARQ processes configured for a scheduling-free transmission of the UE, and the all HARQ processes are a maximum number of processes that may be used by the UE for a scheduling transmission and a scheduling-free transmission. A sixth HARQ process set includes one or more HARQ processes corresponding to PUSCH data received by the base station in the fifth HARQ process set, and the seventh HARQ process set includes one or more HARQ processes with TB-level feedback being NACK in the sixth HARQ process set.

In an embodiment, in a case where a number of CBGs is greater than a maximum value of a bit domain overhead, a CBG binding is employed to feed back CBG-level ACK/NACK information, where the number of CBGs is a product of a number of TBs of the fed back CBG-level ACK/NACK information and a number of CBGs split by each TB, and the maximum value of a bit domain overhead is a maximum value of a DFI bit domain overhead corresponding to the fed back CBG-level ACK/NACK information.

In an embodiment, the CBG binding includes: a first bit is employed to feed back CBG-level ACK/NACK information corresponding to a first third preset number of TBs; and a second bit is employed to feed back CBG-level ACK/NACK information corresponding to a first fourth preset number of TBs. Where a sum of the third preset number and the fourth preset number is the number of TBs of the fed back CBG-level ACK/NACK information, and the third preset number is a residual value between the maximum value of a bit domain overhead and the number of TBs of the fed back CBG-level ACK/NACK information. The first bit is a value obtained by rounding up a ratio between the maximum value of a bit domain overhead and the number of TBs of the fed back CBG-level ACK/NACK information, and the second bit is a value obtained by rounding down a ratio between the maximum value of a bit domain overhead and the number of TBs of the fed back CBG-level ACK/NACK information.

Figure 17:
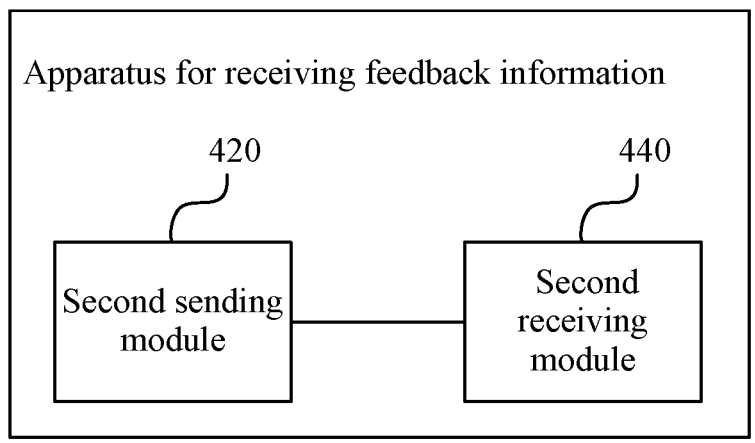
FIG. 17 is a block diagram of an apparatus for receiving feedback information provided in an embodiment of the present application.

FIG. 17 is a block diagram of an apparatus for receiving feedback information provided in an embodiment of the present application. As shown in FIG. 17, the apparatus for receiving the feedback information provided in this embodiment includes a second sending module 420 and a second receiving module 440. The second sending module 420 is configured to send service data to a base station. The second receiving module 440 is configured to receive downlink feedback indication (DFI) information corresponding to the service data, where the DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

The apparatus for receiving the feedback information provided in this embodiment is configured to implement the method for receiving the feedback information according to the embodiment shown in FIG. 15, and the implementation principle and technical effects of the apparatus for receiving the feedback information provided in this embodiment are similar, which will not be repeated here.

In an embodiment, the DFI information further includes at least one of: a downlink control information (DCI) usage marking, a carrier indication, a bandwidth part (BWP) indication, a precoding information indication, a transmission power control (TPC) indication, a modulation and coding scheme (MCS), or a rank indication (RI), where the DCI usage marking is configured for indicating that a usage currently represented by a piece of DCI is a feedback of a DFI or an activation/deactivation of an uplink scheduling-free resource, the carrier indication is configured for indicating that the DCI is effective for a carrier corresponding to a carrier index, and the BWP indication is configured for indicating that the DCI is effective for a BWP corresponding to a BWP index.

In an embodiment, the method for receiving the feedback information further includes: determining a time interval between completion of reception of the service data and completion of preparation of the DFI information; and determining a feedback effectiveness of the DFI information according to the time interval.

In an embodiment, the determining the feedback effectiveness of the DFI information is determined according to the time interval includes: in a case where the time interval is larger than or equal to N symbols or slots, the DFI information being an effective feedback; and in a case where the time interval is less than N symbols or slots, the DFI information being an ineffective feedback. Where N is configured through radio resource control (RRC) signaling configuration or is determined according to a subcarrier interval transmitted by a physical uplink shared channel (PUSCH).

In an embodiment, the service data includes PUSCH data, the PUSCH data includes uplink control information (UCI), the UCI includes an uplink assignment index (UAI), and the UAI is configured for counting PUSCH data sent by the UE.

In an embodiment, the HARQ ACK/NACK indication includes at least one of: TB-level decoding feedback indication information corresponding to a HARQ process, or CBG-level decoding feedback indication information corresponding to a HARQ process.

Figure 18:
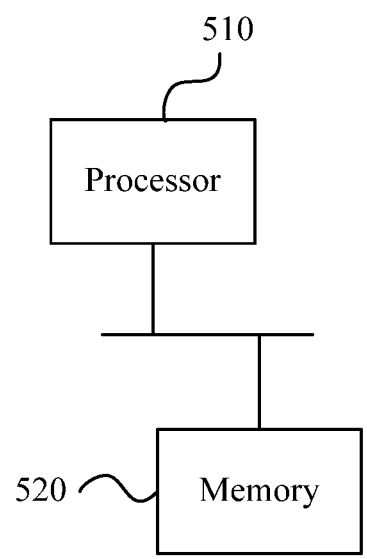
FIG. 18 is a structural diagram of a device provided in an embodiment of the present application.

FIG. 18 is a structural diagram of a device provided in an embodiment of the present application.

As shown in FIG. 18, the device provided in the present application includes a processor 510 and a memory 520. A number of processors 510 in the device may be one or more, with one processor 510 being an example in FIG. 18. A number of memories 520 in the device may be one or more, with one memory 520 being an example in FIG. 18. The processor 510 and the memory 520 of the device may be connected by a bus or in other manners, such as by a bus in FIG. 18. In this embodiment, the device is a base station.

The memory 520, as a computer-readable storage medium, may be configured to store software programs, computer-executable programs, and modules, such as program instructions/modules corresponding to the device of any of the embodiments of the present application (e.g., a first receiving module and a first sending module in the apparatus for sending the feedback information). The memory 520 may include a storage program region and a storage data region, where the storage program region may store an operating system, an application program required for at least one function; the storage data region may store data created according to use of the device, or the like. Moreover, the memory 520 may include a high-speed random access memory and may also include a non-volatile memory, such as at least one magnetic disk storage device, a flash memory device, or other non-volatile solid-state storage device. In some embodiments, the memory 520 may further include a memory remotely disposed with respect to the processor 510, these remote memories may be connected to the device over a network. Instances of the above networks include, but are not limited to, an Internet, an intranet, a local area network, a mobile communication network, and combinations thereof.

The device provided above may be configured to perform the method for sending the feedback information applied to a base station provided in any of the embodiments described above, and has corresponding functions and effects.

When the device is the UE, a program stored in a corresponding memory 520 may be a program instruction/module corresponding to the method for receiving the feedback information applied to the UE provided in the embodiments of the present application, and the processor 510 executes one or more functional applications of the computer device and a data processing by executing a software programs, an instruction and a module stored in the memory 520, that is, implements the method for receiving the feedback information applied to the UE in the above method embodiments. It should be understood that when the above device is the UE, the method for receiving the feedback information applied to the UE provided in any of the embodiments of the present application may be executed, and corresponding functions and effects are achieved.

An embodiment of the present application further provides a storage medium containing a computer-executable instruction, the computer-executable instruction is configured for executing the method for sending the feedback information when being executed by a computer processor, the method is applied to a base station side, and the method includes: receiving service data sent by a user equipment (UE); and sending downlink feedback indication (DFI) information corresponding to the service data to the UE, where the DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

An embodiment of the present disclosure further provides a storage medium containing a computer-executable instruction, the computer-executable instruction is configured for executing the method for receiving the feedback information when being executed by a computer processor, the method is applied to a UE side, and the method includes: sending service data to a base station; and receiving downlink feedback indication (DFI) information corresponding to the service data, where the DFI information includes a hybrid automatic repeat request (HARQ) acknowledgement (ACK)/non-acknowledgement (NACK) indication, and the HARQ ACK/NACK indication is configured for indicating a decoding result of a transport block (TB) and/or a code block group (CBG) in the service data decoded by a base station.

It should be understood by those skilled in the art that the term "user equipment" covers any suitable type of wireless user equipment, such as a mobile phone, a portable data processing apparatus, a portable web browser or a vehicle-mounted mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, a microprocessor or other computing device, although the present application is not limited thereto.

Embodiments of the present application may be implemented by a data processor of a mobile device executing a computer program instruction, for example in a processor entity, or by hardware, or by a combination of software and hardware. The computer program instruction may be an assembler instruction, an instruction set architecture (ISA) instruction, a machine instruction, a machine-related instruction, a microcode, a firmware instruction, state setting data, or a source or object code written in any combination of one or more programming languages.

The block diagrams of any logic flows in the accompany drawings of the present application may represent a program step, or may represent interconnected logic circuits, modules, and functions, or may represent a combination of program steps and logic circuits, modules, and functions. The computer program may be stored on a memory. The memory may be of any type suitable to a local technical environment and may be implemented using any suitable data storage technology, such as, but not limited to, a read-only memory (ROM), a random access memory (RAM), an optical storage device and system (digital Video disk (DVD), or a compact discs (CD)). The computer readable medium may include a non-transitory storage medium. The data processor may be of any type suitable to the local technical environment, such as but not limited to a general purpose computer, a special purpose computer, a microprocessor, a digital signal processor (DSP), an application specific integrated circuit (ASIC), a programmable logic device (FGPA), and a processor based on a multi-core processor architecture.

What is claimed is:

1. A method for sending feedback information, comprising:
    receiving service data sent by a user equipment (UE); and
    sending downlink feedback indication (DFI) information corresponding to the service data to the UE, wherein the DFI information comprises a hybrid automatic repeat request (HARQ) acknowledgement (ACK)/non-acknowledgement (NACK) indication, and the HARQ ACK/NACK indication is configured for indicating a decoding result of at least one of a transport block (TB) or a code block group (CBG) in the service data decoded by a base station;
    wherein the service data comprises physical uplink shared channel (PUSCH) data, the PUSCH data comprises uplink control information (UCI), the UCI comprises an uplink assignment index (UAI), and the UAI is configured for counting the PUSCH data sent by the UE;

wherein the method further comprises: determining a missed detection of the PUSCH data according to the UAI;

transmitting a decoding feedback as NACK when HARQ ACK/NACK feedback is performed for the PUSCH data of a missed detection HARQ process.

2. The method of claim 1, wherein the DFI information further comprises at least one of: a downlink control information (DCI) usage marking, a carrier indication, a bandwidth part (BWP) indication, a precoding information indication, a transmission power control (TPC) indication, a modulation and coding scheme (MCS), or a rank indication (RI);

wherein the DCI usage marking is configured for indicating that a usage currently represented by a piece of DCI is a feedback of a DFI or an activation/deactivation of an uplink scheduling-free resource, the carrier indication is configured for indicating that the DCI is effective for a carrier corresponding to a carrier index, and the BWP indication is configured for indicating that the DCI is effective for a BWP corresponding to a BWP index.

3. The method of claim 2, further comprising:

determining a time interval between completion of reception of the service data and completion of preparation of the DFI information; and determining a feedback effectiveness of the DFI information according to the time interval.

4. The method of claim 3, wherein the determining the feedback effectiveness of the DFI information according to the time interval comprises:

in a case where the time interval is larger than or equal to N symbols or slots, the DFI information being an effective feedback; and in a case where the time interval is less than N symbols or slots, the DFI information being an ineffective feedback, and N is configured through radio resource control (RRC) signaling configuration or is determined according to a subcarrier interval transmitted by a PUSCH.

5. The method of claim 2, wherein the HARQ ACK/NACK indication comprises at least one of: TB-level decoding feedback indication information corresponding to a HARQ process, or CBG-level decoding feedback indication information corresponding to a HARQ process.

6. The method of claim 5, wherein the HARQ ACK/NACK indication comprises at least one of: TB-level ACK/NACK information corresponding to a first HARQ process set, or CBG-level ACK/NACK information corresponding to a first HARQ process set;

wherein the first HARQ process set comprises at least one HARQ process used by a scheduling-free transmission of the UE.

7. The method of claim 5, wherein the HARQ ACK/NACK indication comprises TB-level ACK/NACK information corresponding to a first HARQ process set and CBG-level ACK/NACK information corresponding to a second HARQ process set;

wherein the first HARQ process set comprises at least one HARQ process used by a scheduling-free transmission of the UE, and the second HARQ process set is a set comprising all HARQ processes with TB-level feedback being NACK in the first HARQ process set.

8. The method of claim 5, wherein the HARQ ACK/NACK indication comprises at least one of: TB-level ACK/NACK information corresponding to a fifth HARQ process set, or CBG-level ACK/NACK information corresponding to the fifth HARQ process set;

wherein the fifth HARQ process set comprises all HARQ processes or at least one HARQ process configured for a scheduling-free transmission of the UE, wherein the all HARQ processes are a maximum number of processes that are used by the UE for a scheduling transmission and a scheduling-free transmission.

9. The method of claim 5, wherein the HARQ ACK/NACK indication comprises: a third bitmap, TB-level ACK/NACK information corresponding to a sixth HARQ process set, and CBG-level ACK/NACK information corresponding to the sixth HARQ process set;

wherein the third bitmap is configured for indicating at least one HARQ process in a fifth HARQ process set comprised in the sixth HARQ process set, and the fifth HARQ process set comprises all HARQ processes or at least one HARQ process configured for a scheduling-free transmission of the UE, the sixth HARQ process set is a set comprising at least one HARQ process corresponding to PUSCH data received by the base station in the fifth HARQ process set, and the all HARQ processes are a maximum number of processes that are used by the UE for a scheduling transmission and a scheduling-free transmission.

10. The method of claim 5, wherein the HARQ ACK/NACK indication comprises a third bitmap, TB-level ACK/NACK information corresponding to a sixth HARQ process set, and CBG-level ACK/NACK information corresponding to a seventh HARQ process set;

wherein a fifth HARQ process set comprises all HARQ processes or at least one HARQ process configured for a scheduling-free transmission of the UE, and the all HARQ processes are a maximum number of processes that are used by the UE for a scheduling transmission and a scheduling-free transmission; the sixth HARQ process set is a set comprising at least one HARQ process corresponding to PUSCH data received by the base station in the fifth HARQ process set, and the seventh HARQ process set comprises at least one HARQ process with TB-level feedback being NACK in the sixth HARQ process set, and the third bitmap is configured for indicating at least one HARQ process in the fifth HARQ process set comprised in the sixth HARQ process set.

11. The method of claim 5, wherein the HARQ ACK/NACK indication comprises TB-level ACK/NACK information corresponding to a fifth HARQ process set, a process number indication, and CBG-level ACK/NACK information corresponding to a seventh HARQ process set;

wherein the process number indication is configured for indicating at least one HARQ process comprised in the seventh HARQ process set, the fifth HARQ process set comprises all HARQ processes or at least one HARQ process configured for a scheduling-free transmission of the UE, and the all HARQ processes are a maximum number of processes that are used by the UE for a scheduling transmission and a scheduling-free transmission, and a sixth HARQ process set comprises at least one HARQ process corresponding to PUSCH data received by the base station in the fifth HARQ process set, and the seventh HARQ process set comprises at least one HARQ process with TB-level feedback being NACK in the sixth HARQ process set.

12. The method of claim 5, wherein in a case where a number of CBGs is greater than a maximum value of a bit domain overhead, employing a CBG binding to feed back CBG-level ACK/NACK information, wherein the number of CBGs is a product of a number of TBs of the fed back CBG-level ACK/NACK information and a number of CBGs split by each TB, and the maximum value of a bit domain overhead is a maximum value of a DFI bit domain overhead corresponding to the fed back CBG-level ACK/NACK information.

13. A method for receiving feedback information, comprising:
   sending service data to a base station; and
   receiving downlink feedback indication (DFI) information corresponding to the service data, wherein the DFI information comprises a hybrid automatic repeat request (HARQ) acknowledgement (ACK)/non-acknowledgement (NACK) indication, and the HARQ ACK/NACK indication is configured for indicating a decoding result of a base station on at least one of a transport block (TB) or a code block group (CBG) in the service data;
   wherein the service data comprises physical uplink shared channel (PUSCH) data, the PUSCH data comprises uplink control information (UCI), the UCI comprises an uplink assignment index (UAI), and the UAI is configured for counting the PUSCH data sent by the UE;
   wherein the method further comprises: determining a missed detection of the PUSCH data according to the UAI;
   transmitting a decoding feedback as NACK when HARQ ACK/NACK feedback is performed for PUSCH data of a missed detection HARQ process.

14. The method of claim 13, wherein the DFI information further comprises at least one of: a downlink control information (DCI) usage marking, a carrier indication, a bandwidth part (BWP) indication, a precoding information indication, a transmission power control (TPC) indication, a modulation and coding scheme (MCS), or a rank indication (RI);
   the DCI usage marking is configured for indicating that a usage currently represented by a piece of DCI is a feedback of a DFI or an activation/deactivation of an uplink scheduling-free resource; the carrier indication is configured for indicating that the DCI is effective for a carrier corresponding to a carrier index; and the BWP indication is configured for indicating that the DCI is effective for a BWP corresponding to a BWP index.

15. The method of claim 14, further comprising:
   determining a time interval between completion of sending of the service data and starting of reception of the DFI information; and
   determining a feedback effectiveness of the DFI information according to the time interval.

16. The method of claim 15, wherein determining the feedback effectiveness of the DFI information according to the time interval comprises:
   in a case where the time interval is larger than or equal to N symbols or slots, the DFI information being an effective feedback; and
   in a case where the time interval is less than N symbols or slots, the DFI information being an ineffective feedback, and N is determined through radio resource control (RRC) signaling configuration or according to a subcarrier interval transmitted by a PUSCH.

17. The method of claim 14, wherein the HARQ ACK/NACK indication comprises at least one of: TB-level decoding feedback indication information corresponding to a HARQ process, or CBG-level decoding feedback indication information corresponding to a HARQ process.

18. An apparatus for sending feedback information, comprising:
   a processor;
   a memory, which is configured to store programs executable by the processor; wherein the processor is configured to execute the programs, when executed, perform the method of claim 1.

19. An apparatus for receiving feedback information, comprising:
   a processor;
   a memory, which is configured to store programs executable by the processor; wherein the processor is configured to execute the programs, when executed, perform the method of claim 13.

* * * * *